(12) United States Patent
Wei

(10) Patent No.: US 9,906,723 B2
(45) Date of Patent: Feb. 27, 2018

(54) METHOD FOR SELECTION BETWEEN FRONT-FACING CAMERA AND REAR-FACING CAMERA OF MOBILE TERMINAL AND MOBILE TERMINAL

(71) Applicant: Huawei Technologies Co., Ltd., Shenzhen (CN)

(72) Inventor: He Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/220,564

(22) Filed: Jul. 27, 2016

(65) Prior Publication Data

US 2016/0337588 A1 Nov. 17, 2016

Related U.S. Application Data

(63) Continuation of application No. PCT/CN2014/081100, filed on Jun. 30, 2014.

(30) Foreign Application Priority Data

Jan. 29, 2014 (CN) .......................... 2014 1 0043609

(51) Int. Cl.
*H04N 5/232* (2006.01)
*H04M 1/725* (2006.01)
*H04N 5/225* (2006.01)
*G06T 7/70* (2017.01)
*G06F 3/01* (2006.01)

(52) U.S. Cl.
CPC ........... *H04N 5/23245* (2013.01); *G06T 7/70* (2017.01); *H04M 1/72522* (2013.01);
(Continued)

(58) Field of Classification Search
None
See application file for complete search history.

(56) References Cited

U.S. PATENT DOCUMENTS

| 6,864,912 B1 | 3/2005 | Mahaffey et al. |
| 8,451,312 B2 | 5/2013 | Lee et al. |

(Continued)

FOREIGN PATENT DOCUMENTS

| CN | 101299847 A | 11/2008 |
| CN | 101521696 A | 9/2009 |

(Continued)

OTHER PUBLICATIONS

Partial English Translation and Abstract of Chinese Patent Application No. CN101299847, Apr. 10, 2013, 10 pages.
(Continued)

*Primary Examiner* — Timothy J Henn
(74) *Attorney, Agent, or Firm* — Conley Rose, P.C.

(57) ABSTRACT

A method for selection between a front-facing camera and a rear-facing camera of a mobile terminal and a mobile terminal, which are used to implement automatic selection between the front-facing camera and the rear-facing camera of the mobile terminal is presented. The method in the embodiments of the present disclosure includes receiving, by a mobile terminal, a photographing request initiated by a user; determining, by the mobile terminal, a distance between the mobile terminal and the user; and if the distance is greater than or equal to a preset numeric value, turning on a front-facing camera of the mobile terminal; or if the distance is less than the preset numeric value, turning on a rear-facing camera of the mobile terminal. The embodiments of the present disclosure can implement automatic selection between the front-facing camera and the rear-facing camera of the mobile terminal.

22 Claims, 11 Drawing Sheets

(52) U.S. Cl.
CPC ....... *H04N 5/2258* (2013.01); *H04N 5/23293* (2013.01); *G06F 3/01* (2013.01); *G06T 2207/30244* (2013.01); *H04M 2250/12* (2013.01); *H04M 2250/52* (2013.01)

(56) References Cited

U.S. PATENT DOCUMENTS

| | | |
|---|---|---|
| 2007/0019000 A1 | 1/2007 | Motomura et al. |
| 2009/0017867 A1 | 1/2009 | Koh |
| 2010/0245287 A1 | 9/2010 | Thorn |
| 2011/0216209 A1* | 9/2011 | Fredlund ............ H04N 1/00488 348/211.99 |
| 2012/0081592 A1* | 4/2012 | Lim ................... H04N 5/23293 348/333.04 |
| 2013/0002722 A1 | 1/2013 | Krimon et al. |
| 2014/0118600 A1* | 5/2014 | Son .................... H04N 5/23293 348/333.11 |
| 2014/0139667 A1* | 5/2014 | Kang ................. H04N 5/23296 348/143 |
| 2016/0373646 A1 | 12/2016 | Fredlund et al. |

FOREIGN PATENT DOCUMENTS

| | | | |
|---|---|---|---|
| CN | 102629979 A | | 8/2012 |
| CN | 102685306 A | | 9/2012 |
| CN | 10299847 B | | 4/2013 |
| CN | 103037083 A | | 4/2013 |
| CN | 103227869 A | | 7/2013 |
| CN | 103391366 A | | 11/2013 |
| CN | 103516900 A | | 1/2014 |
| CN | 103795864 A | | 5/2014 |
| EP | 2661068 A2 | | 11/2013 |
| JP | 2003298884 A | | 10/2003 |
| JP | 2005217768 A | * | 8/2005 |
| JP | 2007312039 A | | 11/2007 |
| JP | 2012522415 A | | 9/2012 |
| JP | 2013526099 A | | 6/2013 |
| KR | 20090007166 A | | 1/2009 |
| KR | 20110056094 A | * | 5/2011 |

OTHER PUBLICATIONS

Partial English Translation and Abstract of Chinese Patent Application No. CN102629979, Aug. 8, 2012, 13 pages.
Partial English Translation and Abstract of Chinese Patent Application No. CN103227869, Jul. 31, 2013, 12 pages.
Partial English Translation and Abstract of Chinese Patent Application No. CN103391366, Nov. 13, 2013, 5 pages.
Partial English Translation and Abstract of Chinese Patent Application No. CN103795864, May 14, 2014, 4 pages.
Partial English Translation and Abstract of Chinese Patent Application No. CN101299847, Nov. 5, 2008, 13 pages.
Partial English Translation and Abstract of Chinese Patent Application No. CN101521696, Sep. 2, 2009, 10 pages.
Foreign Communication From a Counterpart Application, Chinese Application No. 201410043609.7, Chinese Office Action dated Apr. 8, 2015, 6 pages.
Foreign Communication From a Counterpart Application, Chinese Application No. 201410043609.7, Chinese Office Action dated Dec. 24, 2015, 6 pages.
Foreign Communication From a Counterpart Application, European Application No. 14881050.0, Extended European Search Report dated Feb. 3, 2017, 5 pages.
Foreign Communication From a Counterpart Application, PCT Application No. PCT/CN2014/081100, English Translation of International Search Report dated Nov. 14, 2014, 2 pages.
Foreign Communication From a Counterpart Application, PCT Application No. PCT/CN2014/081100, English Translation of Written Opinion dated Nov. 14, 2014, 7 pages.
Foreign Communication From a Counterpart Application, Korean Application No. 10-2016-7022197, Korean Office Action dated Jun. 26, 2017, 6 pages.
Foreign Communication From a Counterpart Application, Korean Application No. 10-2016-7022197, English Translation of Korean Office Action dated Jun. 26, 2017, 4 pages.
Foreign Communication From a Counterpart Application, Japanese Application No. 2016-549115, Japanese Office Action dated Oct. 3, 2017, 5 pages.
Foreign Communication From a Counterpart Application, Japanese Application No. 2016-549115, English Translation of Japanese Office Action dated Oct. 3, 2017, 6 pages.
Machine Translation and Abstract of Korean Publication No. KR20110056094, May 26, 2011, 18 pages.
Foreign Communication From a Counterpart Application, Korean Application No. 10-2016-7022197, Korean Notice of Allowance dated Dec. 22, 2017, 3 pages.

* cited by examiner

METHOD FOR SELECTION BETWEEN FRONT-FACING CAMERA AND REAR-FACING CAMERA OF MOBILE TERMINAL AND MOBILE TERMINAL

CROSS-REFERENCE TO RELATED APPLICATION

This application is a continuation of International Application No. PCT/CN2014/081100, filed on Jun. 30, 2014, which claims priority to Chinese Patent Application No. 201410043609.7, filed on Jan. 29, 2014, both of which are hereby incorporated by reference in their entireties.

TECHNICAL FIELD

The present disclosure relates to the field of mobile communications, and in particular, to a method for selection between a front-facing camera and a rear-facing camera of a mobile terminal and a mobile terminal.

BACKGROUND

Front-facing and rear-facing cameras are generally configured on existing mobile terminals (especially, mobile phones), where the rear-facing camera has many functions and is used mostly for photographing scenery and other people, while the front-facing camera is usually used only for self-photographing and video calling.

When a user turns on a camera, an existing terminal generally turns on the rear-facing camera by default. When the user needs to switch to the front-facing camera, the user usually taps an independent button on a screen to implement a switch between the front-facing camera and the rear-facing camera.

However, this manner requires the user to perform manual switching, and is rather complex.

SUMMARY

Embodiments of the present disclosure provide a method for selection between a front-facing camera and a rear-facing camera of a mobile terminal and a mobile terminal, which can implement automatic selection between the front-facing camera and the rear-facing camera of the mobile terminal.

A first aspect of the embodiments of the present disclosure provides a method for selection between a front-facing camera and a rear-facing camera of a mobile terminal, including receiving, by a mobile terminal, a photographing request initiated by a user; determining, by the mobile terminal, a distance between the mobile terminal and the user; and if the distance is greater than or equal to a preset numeric value, turning on a front-facing camera of the mobile terminal; or if the distance is less than the preset numeric value, turning on a rear-facing camera of the mobile terminal.

With reference to the first aspect of the embodiments of the present disclosure, in a first implementation manner of the first aspect of the embodiments of the present disclosure, the determining, by the mobile terminal, a distance between the mobile terminal and the user includes determining, by the mobile terminal, a distance between the mobile terminal and a face of the user.

With reference to the first implementation manner of the first aspect of the embodiments of the present disclosure, in a second implementation manner of the first aspect of the embodiments of the present disclosure, the determining, by the mobile terminal, a distance between the mobile terminal and a face of the user includes determining, by the mobile terminal, a distance between the mobile terminal and a preset position on the face of the user; or determining, by the mobile terminal, an overall distance between the mobile terminal and at least two preset positions on the face of the user.

With reference to the first aspect of the embodiments of the present disclosure, or the first implementation manner of the first aspect, or the second implementation manner of the first aspect, in a third implementation manner of the first aspect of the embodiments of the present disclosure, the preset numeric value is set by the mobile terminal by default.

With reference to the third implementation manner of the first aspect of the embodiments of the present disclosure, in a fourth implementation manner of the first aspect of the embodiments of the present disclosure, the photographing request includes at least a first application request and a second application request; when the photographing request is the first application request, the preset numeric value is a first preset numeric value; when the photographing request is the second application request, the preset numeric value is a second preset numeric value; and the first preset numeric value is different from the second preset numeric value.

With reference to the fourth implementation manner of the first aspect of the embodiments of the present disclosure, in a fifth implementation manner of the first aspect of the embodiments of the present disclosure, the method further includes acquiring a first probability and a second probability, where the first probability is a probability of using the front-facing camera in a first application state, and the second probability is a probability of using the front-facing camera in a second application state; and separately adjusting the first preset numeric value and the second preset numeric value according to the first probability and the second probability, so that the first probability corresponds to the first preset numeric value and the second probability corresponds to the second preset numeric value.

With reference to the third implementation manner of the first aspect of the embodiments of the present disclosure, in a sixth implementation manner of the first aspect of the embodiments of the present disclosure, the method further includes acquiring, by the mobile terminal, information about the user's usage of the front-facing camera and the rear-facing camera, and adjusting the preset numeric value according to the usage information.

With reference to the third implementation manner of the first aspect of the embodiments of the present disclosure, in a seventh implementation manner of the first aspect of the embodiments of the present disclosure, the method further includes acquiring, by the mobile terminal, personal information of the user, and adjusting the preset numeric value according to the personal information.

With reference to the third implementation manner of the first aspect of the embodiments of the present disclosure, in an eighth implementation manner of the first aspect of the embodiments of the present disclosure, the method further includes acquiring, by the mobile terminal, a factor of an environment in which the user is currently located, and adjusting the preset numeric value according to the factor of the environment in which the user is currently located.

With reference to the first aspect of the embodiments of the present disclosure, or the first implementation manner of the first aspect, or the second implementation manner of the first aspect, in a ninth implementation manner of the first aspect of the embodiments of the present disclosure, the method further includes acquiring the preset numeric value entered by the user.

With reference to the first aspect of the embodiments of the present disclosure, or the first implementation manner of the first aspect, or the second implementation manner of the first aspect, in a tenth implementation manner of the first aspect of the embodiments of the present disclosure, before the turning on a front-facing camera of the mobile terminal or before the turning on a rear-facing camera of the mobile terminal, the method further includes sending an inquiry request to the user, where the inquiry request is used to ask the user whether to agree to turn on the camera; acquiring a reply from the user; and when the reply is agreeing to turn on the camera or no reply is received within a preset time period, triggering the turning on of the front-facing camera of the mobile terminal or the rear-facing camera of the mobile terminal; or when the reply is refusing to turn on the camera, triggering a default action of the mobile terminal.

A second aspect of the embodiments of the present disclosure provides a mobile terminal, including a front-facing camera and a rear-facing camera; a receiving module configured to receive a photographing request initiated by a user; a determining module configured to determine a distance between the mobile terminal and the user; and a control module configured to, when the distance is greater than or equal to a preset numeric value, turn on the front-facing camera of the mobile terminal; or when the distance is less than the preset numeric value, turn on the rear-facing camera of the mobile terminal.

With reference to the second aspect of the embodiments of the present disclosure, in a first implementation manner of the second aspect of the embodiments of the present disclosure, the determining module is configured to determine a distance between the mobile terminal and a face of the user.

With reference to the first implementation manner of the second aspect of the embodiments of the present disclosure, in a second implementation manner of the second aspect of the embodiments of the present disclosure, the determining module is configured to determine a distance between the mobile terminal and a preset position on the face of the user; or the determining module is configured to determine an overall distance between the mobile terminal and at least two preset positions on the face of the user.

With reference to the second aspect, or the first implementation manner of the second aspect, or the second implementation manner of the second aspect, in a third implementation manner of the second aspect of the embodiments of the present disclosure, the preset numeric value is set by the mobile terminal by default.

With reference to the third implementation manner of the second aspect of the embodiments of the present disclosure, in a fourth implementation manner of the second aspect of the embodiments of the present disclosure, the photographing request includes at least a first application request and a second application request; when the photographing request is the first application request, the preset numeric value is a first preset numeric value; when the photographing request is the second application request, the preset numeric value is a second preset numeric value; and the first preset numeric value is different from the second preset numeric value.

With reference to the fourth implementation manner of the second aspect of the embodiments of the present disclosure, in a fifth implementation manner of the second aspect of the embodiments of the present disclosure, the mobile terminal further includes a first acquiring module configured to acquire a first probability and a second probability, where the first probability is a probability of using the front-facing camera by the user in a first application state, and the second probability is a probability of using the front-facing camera by the user in a second application state; and a first adjusting module configured to separately adjust the first preset numeric value and the second preset numeric value according to the first probability and the second probability, so that the first probability corresponds to the first preset numeric value and the second probability corresponds to the second preset numeric value.

With reference to the third implementation manner of the second aspect of the embodiments of the present disclosure, in a sixth implementation manner of the second aspect of the embodiments of the present disclosure, the mobile terminal further includes a second acquiring module configured to acquire information about the user's usage of the front-facing camera and the rear-facing camera; and a second adjusting module configured to adjust the preset numeric value according to the usage information.

With reference to the third implementation manner of the second aspect of the embodiments of the present disclosure, in a seventh implementation manner of the second aspect of the embodiments of the present disclosure, the mobile terminal further includes a third acquiring module configured to acquire personal information of the user, and adjust the preset numeric value according to the personal information; and a third adjusting module configured to adjust the preset numeric value according to the personal information.

With reference to the third implementation manner of the second aspect of the embodiments of the present disclosure, in an eighth implementation manner of the second aspect of the embodiments of the present disclosure, the mobile terminal further includes a fourth acquiring module configured to acquire a factor of an environment in which the user is currently located; and a fourth adjusting module configured to adjust the preset numeric value according to the factor of the environment in which the user is currently located.

With reference to the second aspect of the embodiments of the present disclosure, or the first implementation manner of the second aspect, or the second implementation manner of the second aspect, in a ninth implementation manner of the second aspect of the embodiments of the present disclosure, the mobile terminal further includes a fifth acquiring module configured to acquire the preset numeric value entered by the user.

With reference to the second aspect of the embodiments of the present disclosure, or the first implementation manner of the second aspect, or the second implementation manner of the second aspect, in a tenth implementation manner of the second aspect of the embodiments of the present disclosure, the mobile terminal further includes an inquiry module configured to send an inquiry request to the user, where the inquiry request is used to ask the user whether to agree to turn on the camera; a sixth acquiring module configured to acquire a reply from the user; a first triggering unit configured to, when the reply is agreeing to turn on the camera, trigger the control module to turn on the front-facing camera of the mobile terminal or turn on the rear-facing camera of the mobile terminal; and a second triggering unit configured to, when the reply is refusing to turn on the camera, trigger a default action of the mobile terminal.

It can be seen from the foregoing technical solutions that the embodiments of the present disclosure have the following advantages.

In the embodiments of the present disclosure, it is determined whether a distance between a mobile terminal and a user is greater than a preset numeric value, so as to automatically determine whether to turn on a front-facing camera of the mobile terminal or turn on a rear-facing camera of the mobile terminal, thereby implementing automatic selection between the front-facing camera and the rear-facing camera of the mobile terminal, avoiding a case in which the user needs to perform manual selection, and improving user experience for the mobile terminal.

DESCRIPTION OF EMBODIMENTS

Embodiments of the present disclosure provide a method for selection between a front-facing camera and a rear-facing camera of a mobile terminal and a mobile terminal, which are used to implement automatic selection between the front-facing camera and the rear-facing camera of the mobile terminal.

To make persons skilled in the art understand the technical solutions in the present disclosure better, the following clearly and completely describes the technical solutions in the embodiments of the present disclosure with reference to the accompanying drawings in the embodiments of the present disclosure. Thespe described embodiments are merely a part rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
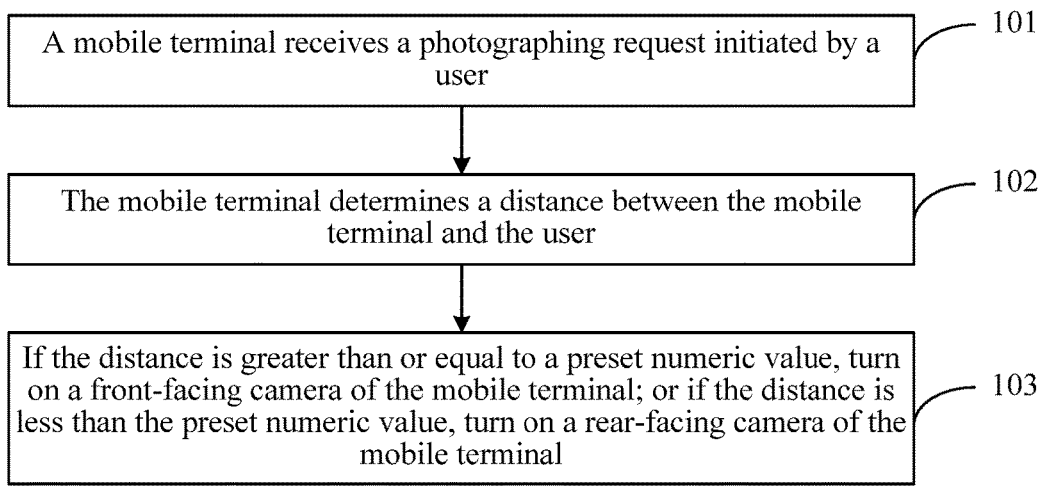
FIG. 1 is a flowchart of a method for selection between a front-facing camera and a rear-facing camera of a mobile terminal according to an embodiment of the present disclosure.

Referring to FIG. 1, an embodiment of a method for selection between a front-facing camera and a rear-facing camera of a mobile terminal according to an embodiment of the present disclosure includes the following steps.

Step 101. A mobile terminal receives a photographing request initiated by a user.

The mobile terminal may be a mobile phone, a tablet computer, or another mobile terminal having a camera, where a front-facing camera and a rear-facing camera are disposed on the mobile terminal, the front-facing camera refers to a camera that is located at a same side as a display screen of the mobile terminal, and the rear-facing camera refers to a camera that is located at the other side of the mobile terminal opposite to the display screen of the mobile terminal. When a user needs to take a picture, the user may trigger a photographing function of the mobile terminal. The mobile terminal receives a photographing request initiated by the user, and prepares to turn on a camera to enter a photographing state.

Step 102. The mobile terminal determines a distance between the mobile terminal and the user.

A distance measurement module that can measure a distance between the mobile terminal and the user is disposed in the mobile terminal, where the distance measurement module may be an independently disposed distance sensor or proximity sensor, or may be a distance sensor that is configured in the camera of the mobile terminal to implement an automatic focus function. Certainly, in an actual application, the distance measurement module may be another sensor or module that can implement the same function.

It should be noted that, there are two cases herein. In a first case, the camera of the mobile terminal is off when the user initiates the photographing request to the mobile terminal. The mobile terminal determines a distance between the mobile terminal and the user when the user initiates the photographing request to the mobile terminal, so as to determine, according to the distance, whether to turn on the front-facing camera or turn on the rear-facing camera. The mobile terminal may first turn on a default camera after receiving the photographing request initiated by the user, and then determine, according to the distance, whether to switch to or additionally turn on the front-facing camera or the rear-facing camera, or directly determine, according to the distance, whether to turn on the front-facing camera or the rear-facing camera, which is not limited herein.

In the first case, the distance measurement module may detect the distance between the mobile terminal and the user all the time, and when receiving the photographing request initiated by the user, the mobile terminal determines a current distance according to the distance measurement module thereof; or the distance measurement module detects the distance between the mobile terminal and the user only when the screen is on, and when receiving the photographing request initiated by the user, the mobile terminal determines a current distance according to the distance measurement module thereof; or the distance measurement module may detect a current distance between the mobile terminal and the user only when the mobile terminal receives the photographing request initiated by the user, and the mobile terminal determines, according to the distance measurement module thereof, the distance measured by the distance measurement module.

In a second case, when receiving the photographing request initiated by the user, the mobile terminal is currently in a photographing state. In the whole photographing process of the mobile terminal, the distance measurement module detects the distance between the mobile terminal and the user in real time; the mobile terminal determines a current distance according to the distance measurement module thereof, and determines, according to the distance, whether to switch from a currently used camera to the other camera or whether the other camera needs to be simultaneously turned on.

It should be noted that, in the foregoing description, the distance, between the mobile terminal and the user, measured by the distance measurement module may be an instantaneous value that is currently measured between the mobile terminal and the user, or may be an average value or a sample value of distances between the mobile terminal and the user within preset duration. Certainly, the foregoing description is merely an example, and is not limited herein.

Step 103. If the distance is greater than or equal to a preset numeric value, turn on a front-facing camera of the mobile terminal; or if the distance is less than the preset numeric value, turn on a rear-facing camera of the mobile terminal.

After determining the distance between the mobile terminal and the user, the mobile terminal determines whether the distance is greater than or less than the preset numeric value. If the distance is greater than or equal to the preset numeric value, the front-facing camera is turned on; or the distance is less than the preset numeric value, the rear-facing camera is turned on. In the foregoing first case, after receiving the photographing request initiated by the user, the mobile terminal may directly select, according to the distance, to turn on a corresponding camera; or the mobile terminal may first turn on a default camera, and if a camera corresponding to the distance is different from the default camera, switch from the default camera to the camera corresponding to the distance, or additionally turn on the camera corresponding to the distance, that is, simultaneously turn on the front-facing camera and the rear-facing camera.

In the foregoing second case, if the camera corresponding to the distance is different from a currently used camera, the mobile terminal switches from the currently used camera to the camera corresponding to the distance, or the mobile terminal additionally turns on the camera corresponding to the distance, that is, simultaneously turns on the front-facing camera and the rear-facing camera.

In this embodiment, it is determined whether a distance between a mobile terminal and a user is greater than a preset numeric value, so as to automatically determine whether to turn on a front-facing camera of the mobile terminal or turn on a rear-facing camera of the mobile terminal, thereby implementing automatic selection between the front-facing camera and the rear-facing camera of the mobile terminal, avoiding a case in which the user needs to perform manual selection, and improving user experience for the mobile terminal.

Figure 2:
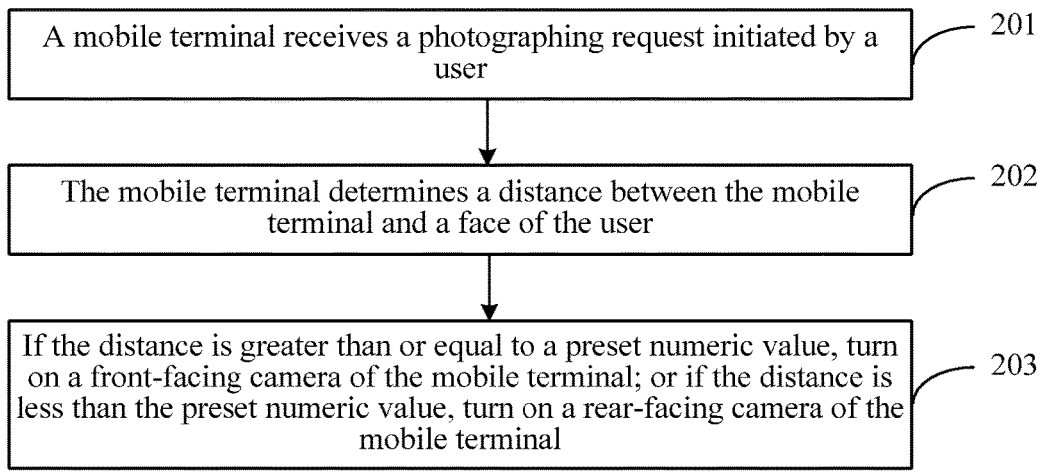
FIG. 2 is a flowchart of a method for selection between a front-facing camera and a rear-facing camera of a mobile terminal according to another embodiment of the present disclosure.

In the foregoing embodiment, a distance between a mobile terminal and a user is determined, so as to determine whether to turn on a front-facing camera or a rear-facing camera. In an actual application, the distance may be a distance between the mobile terminal and a face of the user, and the following describes a method for selection between a front-facing camera and a rear-facing camera of a mobile terminal according to an embodiment of the present disclosure. Referring to FIG. 2, another embodiment of a method for selection between a front-facing camera and a rear-facing camera of a mobile terminal according to an embodiment of the present disclosure includes the following steps.

Step 201. A mobile terminal receives a photographing request initiated by a user.

The mobile terminal may be a mobile phone, a tablet computer, or another mobile terminal having a camera, where a front-facing camera and a rear-facing camera are disposed on the mobile terminal, the front-facing camera refers to a camera that is located at a same side as a display screen of the mobile terminal, and the rear-facing camera refers to a camera that is located at the other side of the mobile terminal opposite to the display screen of the mobile terminal. When a user needs to take a picture, the user may trigger a photographing function of the mobile terminal. The mobile terminal receives a photographing request initiated by the user, and prepares to turn on a camera to enter a photographing state.

Step 202. The mobile terminal determines a distance between the mobile terminal and a face of the user.

When the distance measurement module in the mobile terminal measures the distance between the mobile terminal and the user, the distance measurement module may measure the distance between the mobile terminal and the face of the user. During measurement of the distance, the distance may be a distance between the mobile terminal and a specific preset position on the face of the user, for example, the distance is a distance between the mobile terminal and a central point between the two eyes of the user, or a distance between the mobile terminal and the nose of the user; or the distance may be an overall distance between the mobile terminal and at least two preset positions on the face of the user, for example, the distance is equal to an average value of distances between the mobile terminal and the two eyes of the user, or an average value of distances between the mobile terminal and the five sense organs of the user. Certainly, the foregoing description is merely an example, and is not limited herein.

Certainly, in an actual application, the mobile terminal may not determine the distance between the mobile terminal and the face of the user, but determine a distance between the mobile terminal and another portion of the user, which is not limited herein. Preferably, the mobile terminal may receive a setting by the user for a specific definition of the distance.

In an actual application, the determining a distance between the mobile terminal and a face of the user may be determining a distance between a camera of the mobile terminal and the face of the user, or determining a distance between another position on the mobile terminal and the face of the user, or determining an overall distance between at least two positions on the mobile terminal and the face of the user, which is not limited herein.

Step 203. If the distance is greater than or equal to a preset numeric value, turn on a front-facing camera of the mobile terminal; or if the distance is less than the preset numeric value, turn on a rear-facing camera of the mobile terminal.

After determining the distance between the mobile terminal and the user, the mobile terminal determines whether the distance is greater than or less than the preset numeric value. If the distance is greater than or equal to the preset numeric value, the front-facing camera is turned on; or the distance is less than the preset numeric value, the rear-facing camera is turned on. In the foregoing first case, after receiving the photographing request initiated by the user, the mobile terminal may directly select, according to the distance, to turn on a corresponding camera; or the mobile terminal may first turn on a default camera, and if a camera corresponding to the distance is different from the default camera, switch from the default camera to the camera corresponding to the distance, or additionally turn on the camera corresponding to the distance, that is, simultaneously turn on the front-facing camera and the rear-facing camera.

In the foregoing second case, if the camera corresponding to the distance is different from a currently used camera, the mobile terminal switches from the currently used camera to the camera corresponding to the distance, or the mobile terminal additionally turns on the camera corresponding to the distance, that is, simultaneously turns on the front-facing camera and the rear-facing camera.

In this embodiment, the determining of the distance between the mobile terminal and the face of the user conforms better to a self-photographing behavior often performed by the user using the mobile terminal in an actual application, so that the mobile terminal more accurately determines, according to the distance, whether to turn on the front-facing camera or the rear-facing camera, so as to better meet an actual requirement of the user.

Figure 3:
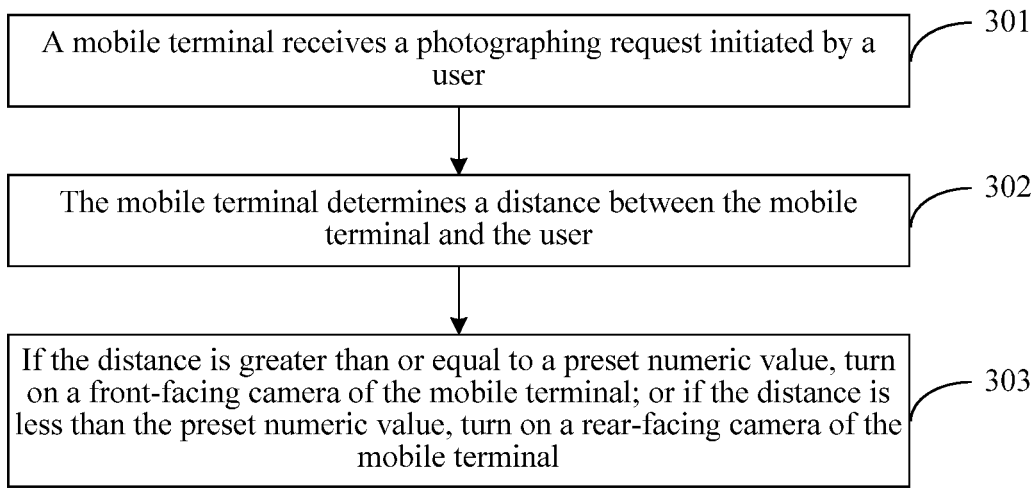
FIG. 3 is a flowchart of a method for selection between a front-facing camera and a rear-facing camera of a mobile terminal according to another embodiment of the present disclosure.

In the foregoing embodiment, if the determined distance is greater than or equal to the preset numeric value, the front-facing camera is turned on; otherwise, the rear-facing camera is turned on. In an actual application, the preset numeric value may be set by the mobile terminal by default, and the following describes a method for selection between a front-facing camera and a rear-facing camera of a mobile terminal according to an embodiment of the present disclosure. Referring to FIG. 3, another embodiment of a method for selection between a front-facing camera and a rear-facing camera of a mobile terminal according to an embodiment of the present disclosure includes the following steps.

Step 301. A mobile terminal receives a photographing request initiated by a user.

The mobile terminal may be a mobile phone, a tablet computer, or another mobile terminal having a camera, where a front-facing camera and a rear-facing camera are disposed on the mobile terminal, the front-facing camera refers to a camera that is located at a same side as a display screen of the mobile terminal, and the rear-facing camera refers to a camera that is located at the other side of the mobile terminal opposite to the display screen of the mobile terminal. When a user needs to take a picture, the user may trigger a photographing function of the mobile terminal. The mobile terminal receives a photographing request initiated by the user, and prepares to turn on a camera to enter a photographing state. The photographing request includes at least a first application request and a second application request. For a specific example, the photographing request includes a video-shooting request and a picture-taking request, or further includes a video call request. Certainly, the foregoing description is merely an example, and is not limited herein.

Step 302. The mobile terminal determines a distance between the mobile terminal and the user.

A distance measurement module that can measure a distance between the mobile terminal and the user is disposed in the mobile terminal, where the distance measurement module may be an independently disposed distance sensor or proximity sensor, or may be a distance sensor that is configured in the camera of the mobile terminal to implement an automatic focus function. Certainly, in an actual application, the distance measurement module may be another sensor or module that can implement the same function.

It should be noted that, there are two cases herein. In a first case, the camera of the mobile terminal is off when the user initiates the photographing request to the mobile terminal. The mobile terminal determines a distance between the mobile terminal and the user when the user initiates the photographing request to the mobile terminal, so as to determine, according to the distance, whether to turn on the front-facing camera or turn on the rear-facing camera. The mobile terminal may first turn on a default camera after receiving the photographing request initiated by the user, and then determine, according to the distance, whether to switch to or additionally turn on the front-facing camera or the rear-facing camera, or directly determine, according to the distance, whether to turn on the front-facing camera or the rear-facing camera, which is not limited herein.

In the first case, the distance measurement module may detect the distance between the mobile terminal and the user all the time, and when receiving the photographing request initiated by the user, the mobile terminal determines a current distance according to the distance measurement module thereof; or the distance measurement module detects the distance between the mobile terminal and the user only when the screen is on, and when receiving the photographing request initiated by the user, the mobile terminal determines a current distance according to the distance measurement module thereof; or the distance measurement module may detect a current distance between the mobile terminal and the user only when the mobile terminal receives the photographing request initiated by the user, and the mobile terminal determines, according to the distance measurement module thereof, the distance measured by the distance measurement module.

In a second case, when receiving the photographing request initiated by the user, the mobile terminal is currently in a photographing state. In a whole photographing process of the mobile terminal, the distance measurement module detects the distance between the mobile terminal and the user in real time, and the mobile terminal determines a current distance according to the distance measurement module thereof.

It should be noted that, in the foregoing description, the distance, between the mobile terminal and the user, measured by the distance measurement module may be an instantaneous value that is currently measured between the mobile terminal and the user, or may be an average value or a sample value of distances between the mobile terminal and the user within preset duration. Certainly, the foregoing description is merely an example, and is not limited herein.

Step 303. If the distance is greater than or equal to a preset numeric value, turn on a front-facing camera of the mobile terminal; or if the distance is less than a preset numeric value, turn on a rear-facing camera of the mobile terminal.

In this embodiment, the preset numeric value is set by the mobile terminal by default. For a specific example, the mobile terminal may set, by default, that the preset numeric value is 0.7 times to 1 times an average arm length of adults in a sales territory of the mobile terminal.

When the user initiates different photographing requests, cases in which the user uses the front-facing camera and the rear-facing camera separately may be different. Therefore, preferably, in this embodiment, when it is determined, according to whether the distance is less than the preset numeric value, whether to turn on the front-facing camera or the rear-facing camera, for different photographing requests, preset numeric values set by the mobile terminal by default are different. When the photographing request received by the mobile terminal and initiated by the user is a first application request, and if the distance is greater than or equal to a first preset numeric value, the front-facing camera of the mobile terminal is turned on; or if the distance is less than a first preset numeric value, the rear-facing camera of the mobile terminal is turned on. When the photographing request received by the mobile terminal and initiated by the user is a second application request, and if the distance is greater than or equal to a second preset numeric value, the front-facing camera of the mobile terminal is turned on; or if the distance is less than a second preset numeric value, the rear-facing camera of the mobile terminal is turned on. The first preset numeric value is different from the second preset numeric value.

Certainly, in an actual application, the photographing request initiated by the user may not only include the first application request and the second application request, but may also include a third application request, a fourth application request, a fifth application request, or the like. Except for the first application request and the second application request, all or some of preset numeric values corresponding to other application requests may be the same, or the preset numeric values may be different from each other, which is not limited herein.

Certainly, in an actual application, the preset numeric values that are set by the mobile terminal by default and correspond to the different photographing requests initiated by the user may be all the same, which is not limited herein.

In this embodiment, the mobile terminal sets different preset numeric values by default for different photographing requests, so that the mobile terminal can automatically turn on the front-facing camera or the rear-facing camera more flexibly according to an actual situation, thereby improving user experience.

Figure 4:
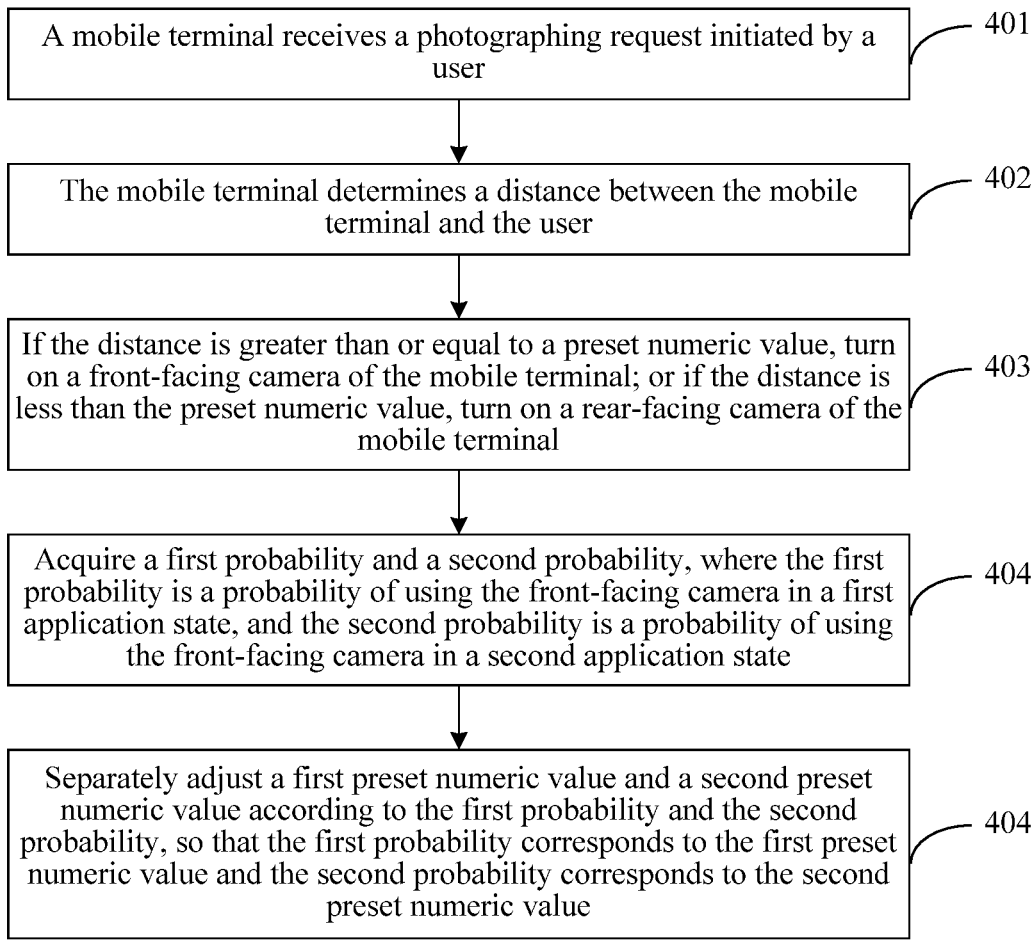
FIG. 4 is a flowchart of a method for selection between a front-facing camera and a rear-facing camera of a mobile terminal according to another embodiment of the present disclosure.

In the foregoing embodiment, for different photographing requests, preset numeric values set by the mobile terminal by default are different. In an actual application, for different photographing requests, the mobile terminal may further adjust, according to another method, preset numeric values corresponding to the different photographing requests. The following describes a method for selection between a front-facing camera and a rear-facing camera of a mobile terminal according to an embodiment of the present disclosure. Referring to FIG. 4, another embodiment of a method for selection between a front-facing camera and a rear-facing camera of a mobile terminal according to an embodiment of the present disclosure includes the following steps.

Step 401. A mobile terminal receives a photographing request initiated by a user.

The mobile terminal may be a mobile phone, a tablet computer, or another mobile terminal having a camera, where a front-facing camera and a rear-facing camera are disposed on the mobile terminal, the front-facing camera refers to a camera that is located at a same side as a display screen of the mobile terminal, and the rear-facing camera refers to a camera that is located at the other side of the mobile terminal opposite to the display screen of the mobile terminal. When a user needs to take a picture, the user may trigger a photographing function of the mobile terminal. The mobile terminal receives a photographing request initiated by the user, and prepares to turn on a camera to enter a photographing state. The photographing request includes at least a first application request and a second application request. For a specific example, the photographing request includes a video-shooting request and a picture-taking request, or further includes a video call request. Certainly, the foregoing description is merely an example, and is not limited herein.

Step 402. The mobile terminal determines a distance between the mobile terminal and the user.

A distance measurement module that can measure a distance between the mobile terminal and the user is disposed in the mobile terminal, where the distance measurement module may be an independently disposed distance sensor or proximity sensor, or may be a distance sensor that is configured in the camera of the mobile terminal to implement an automatic focus function. Certainly, in an actual application, the distance measurement module may be another sensor or module that can implement the same function.

It should be noted that, there are two cases herein. In a first case, the camera of the mobile terminal is off when the user initiates the photographing request to the mobile terminal. The mobile terminal determines a distance between the mobile terminal and the user when the user initiates the photographing request to the mobile terminal, so as to determine, according to the distance, whether to turn on the front-facing camera or turn on the rear-facing camera. The mobile terminal may first turn on a default camera after receiving the photographing request initiated by the user, and then determine, according to the distance, whether to switch to or additionally turn on the front-facing camera or the rear-facing camera, or directly determine, according to the distance, whether to turn on the front-facing camera or the rear-facing camera, which is not limited herein.

In the first case, the distance measurement module may detect the distance between the mobile terminal and the user all the time, and when receiving the photographing request initiated by the user, the mobile terminal determines a current distance according to the distance measurement module thereof; or the distance measurement module detects the distance between the mobile terminal and the user only when the screen is on, and when receiving the photographing request initiated by the user, the mobile terminal determines a current distance according to the distance measurement module thereof or the distance measurement module may detect a current distance between the mobile terminal and the user only when the mobile terminal receives the photographing request initiated by the user, and the mobile terminal determines, according to the distance measurement module thereof, the distance measured by the distance measurement module.

In a second case, when receiving the photographing request initiated by the user, the mobile terminal is currently in a photographing state. In a whole photographing process of the mobile terminal, the distance measurement module detects the distance between the mobile terminal and the user in real time, and the mobile terminal determines a current distance according to the distance measurement module thereof.

It should be noted that, in the foregoing description, the distance, between the mobile terminal and the user, measured by the distance measurement module may be an instantaneous value that is currently measured between the mobile terminal and the user, or may be an average value or a sample value of distances between the mobile terminal and the user within preset duration. Certainly, the foregoing description is merely an example, and is not limited herein.

Step 403. If the distance is greater than or equal to a preset numeric value, turn on a front-facing camera of the mobile terminal; or if the distance is less than a preset numeric value, turn on a rear-facing camera of the mobile terminal.

In this embodiment, the preset numeric value is set by the mobile terminal by default. Different photographing requests correspond to different preset numeric values. When the photographing request received by the mobile terminal and initiated by the user is a first application request, and if the distance is greater than or equal to a first preset numeric value, the front-facing camera of the mobile terminal is turned on; or if the distance is less than a first preset numeric value, the rear-facing camera of the mobile terminal is turned on. When the photographing request received by the mobile terminal and initiated by the user is a second application request, and if the distance is greater than or equal to a second preset numeric value, the front-facing camera of the mobile terminal is turned on; or if the distance is less than a second preset numeric value, the rear-facing camera of the mobile terminal is turned on. The first preset numeric value is different from the second preset numeric value.

Certainly, in an actual application, the photographing request initiated by the user may not only include the first application request and the second application request, but may also include a third application request, a fourth application request, a fifth application request, or the like. Except for the first application request and the second application request, all or some of preset numeric values corresponding to other application requests may be the same, or the preset numeric values may be different from each other, which is not limited herein.

Step 404. Acquire a first probability and a second probability, where the first probability is a probability of using the front-facing camera in a first application state, and the second probability is a probability of using the front-facing camera in a second application state.

The mobile terminal counts quantities of times that a camera is applied to a first application and a second application separately and quantities of times that the front-facing camera and the rear-facing camera are separately used in the two different applications, and then calculates a first probability and a second probability of using the front-facing camera respectively in a first application state and a second application state of the camera of the mobile terminal. For a specific example, the mobile terminal counts a quantity of times that the camera is applied, and obtains that a quantity of times that the camera is applied to the first application is 589 and a quantity of times that the camera is applied to the second application is 628, where a quantity of times of using the front-facing camera when the camera is in the first application state is 342, and a quantity of times of using the front-facing camera when the camera is in the second application state is 381. Therefore, it can be obtained through calculation that the first probability of using the front-facing camera in the first application state is 342/589 and the second probability of using the front-facing camera in the second application state is 381/628.

Certainly, in an actual application, a probability of using the front-facing camera in another application state may also be acquired, or only probabilities of using the front-facing camera in two most commonly used application states are acquired, or only probabilities of using the front-facing camera in two application states selected by the user are counted, which is not limited herein.

After the first probability and the second probability are calculated, the mobile terminal may update the two probabilities at preset intervals, or may update the data each time after the camera is used, which is not limited herein.

Step 405. Separately adjust a first preset numeric value and a second preset numeric value according to the first probability and the second probability, so that the first probability corresponds to the first preset numeric value and the second probability corresponds to the second preset numeric value.

After the first probability and the second probability are acquired, if the first probability is greater than the second probability, the first preset numeric value and/or the second preset numeric value is adjusted, so that the first preset numeric value is less than the second preset numeric value. For a specific example, the first probability is a probability of using the front-facing camera when the camera is in a video call state, the second probability is a probability of using the front-facing camera when the camera is in a photographing state, and the first probability is greater than the second probability. Therefore, the mobile terminal adjusts the first preset numeric value and/or the second preset numeric value according to the first probability being greater than the second probability, so that the first preset numeric value is less than the second preset numeric value.

When the first preset numeric value and/or the second preset numeric value is adjusted so that the first preset numeric value is less than the second preset numeric value, a ratio of the first preset numeric value to the second preset numeric value may be made proportional to a ratio of the second probability to the first probability; or a difference between the first preset numeric value and the second preset numeric value may be made proportional to a difference between the second probability and the first probability. Certainly, in an actual application, another manner may be used so that the first probability corresponds to the first preset numeric value and the second probability corresponds to the second preset numeric value, which is not limited herein.

In an actual application, the mobile terminal may adjust the first preset numeric value and the second preset numeric value at preset intervals, for example, the mobile terminal adjusts the first preset numeric value and the second preset numeric value after the first probability and the second probability are updated, or may adjust the first preset numeric value and the second preset numeric value each time after the camera is used.

In this embodiment, the mobile terminal sets, according to different probabilities of using the front-facing camera in different application states of the camera, preset numeric values corresponding to the different application states, so that the mobile terminal can automatically turn on the front-facing camera or the rear-facing camera more flexibly according to an actual situation, thereby improving user experience.

Figure 5:
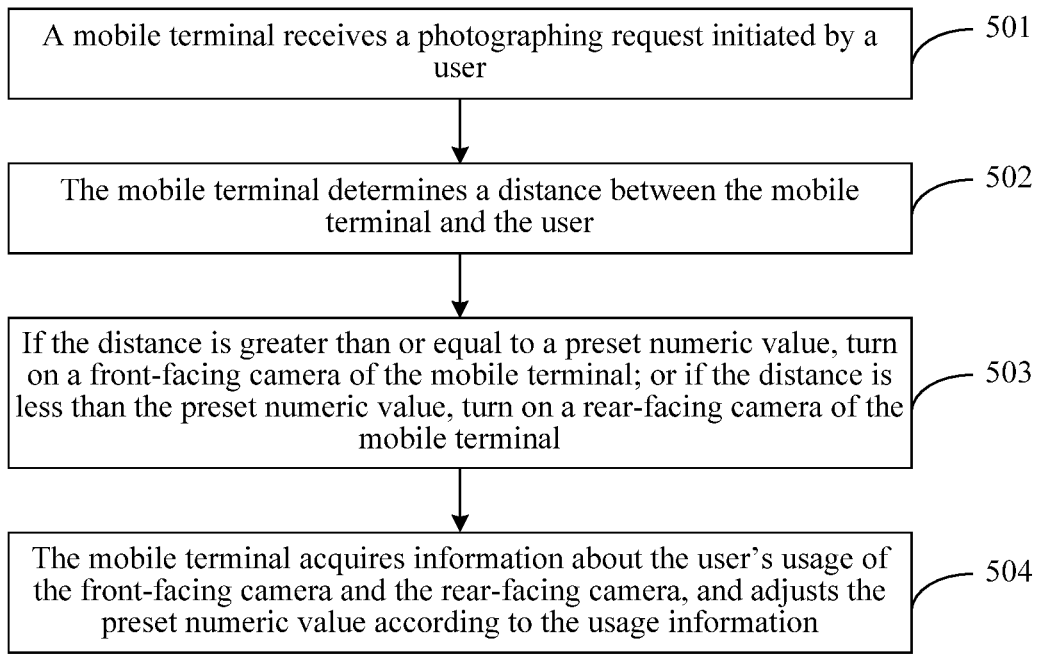
FIG. 5 is a flowchart of a method for selection between a front-facing camera and a rear-facing camera of a mobile terminal according to another embodiment of the present disclosure.

In the foregoing embodiment, the preset numeric values set by the mobile terminal by default are adjusted separately according to the first probability and the second probability. In an actual application, the mobile terminal may adjust the preset numeric value using another method, and the following describes a method for selection between a front-facing camera and a rear-facing camera of a mobile terminal according to an embodiment of the present disclosure. Referring to FIG. 5, another embodiment of a method for selection between a front-facing camera and a rear-facing camera of a mobile terminal according to an embodiment of the present disclosure includes the following steps.

Step 501. A mobile terminal receives a photographing request initiated by a user.

The mobile terminal may be a mobile phone, a tablet computer, or another mobile terminal having a camera, where a front-facing camera and a rear-facing camera are disposed on the mobile terminal, the front-facing camera refers to a camera that is located at a same side as a display screen of the mobile terminal, and the rear-facing camera refers to a camera that is located at the other side of the mobile terminal opposite to the display screen of the mobile terminal. When a user needs to take a picture, the user may trigger a photographing function of the mobile terminal. The mobile terminal receives a photographing request initiated by the user, and prepares to turn on a camera to enter a photographing state. The photographing request includes at least a first application request and a second application request. For a specific example, the photographing request includes a video-shooting request and a picture-taking request, or further includes a video call request. Certainly, the foregoing description is merely an example, and is not limited herein.

Step 502. The mobile terminal determines a distance between the mobile terminal and the user.

A distance measurement module that can measure a distance between the mobile terminal and the user is disposed in the mobile terminal, where the distance measurement module may be an independently disposed distance sensor or proximity sensor, or may be a distance sensor that is configured in the camera of the mobile terminal to implement an automatic focus function. Certainly, in an actual application, the distance measurement module may be another sensor or module that can implement the same function.

It should be noted that, there are two cases herein. In a first case, the camera of the mobile terminal is off when the user initiates the photographing request to the mobile terminal. The mobile terminal determines a distance between the mobile terminal and the user when the user initiates the photographing request to the mobile terminal, so as to determine, according to the distance, whether to turn on the front-facing camera or turn on the rear-facing camera. The mobile terminal may first turn on a default camera after receiving the photographing request initiated by the user, and then determine, according to the distance, whether to switch to or additionally turn on the front-facing camera or the rear-facing camera, or directly determine, according to the distance, whether to turn on the front-facing camera or the rear-facing camera, which is not limited herein.

In the first case, the distance measurement module may detect the distance between the mobile terminal and the user all the time, and when receiving the photographing request initiated by the user, the mobile terminal determines a current distance according to the distance measurement module thereof or the distance measurement module detects the distance between the mobile terminal and the user only when the screen is on, and when receiving the photographing request initiated by the user, the mobile terminal determines a current distance according to the distance measurement module thereof or the distance measurement module may detect a current distance between the mobile terminal and the user only when the mobile terminal receives the photographing request initiated by the user, and the mobile terminal determines, according to the distance measurement module thereof, the distance measured by the distance measurement module.

In a second case, when receiving the photographing request initiated by the user, the mobile terminal is currently in a photographing state. In a whole photographing process of the mobile terminal, the distance measurement module detects the distance between the mobile terminal and the user in real time, and the mobile terminal determines a current distance according to the distance measurement module thereof.

It should be noted that, in the foregoing description, the distance, between the mobile terminal and the user, measured by the distance measurement module may be an instantaneous value that is currently measured between the mobile terminal and the user, or may be an average value or a sample value of distances between the mobile terminal and the user within preset duration. Certainly, the foregoing description is merely an example, and is not limited herein.

Step 503. If the distance is greater than or equal to a preset numeric value, turn on a front-facing camera of the mobile terminal; or if the distance is less than a preset numeric value, turn on a rear-facing camera of the mobile terminal.

In this embodiment, the preset numeric value is set by the mobile terminal by default. Different photographing requests correspond to different preset numeric values. When the photographing request received by the mobile terminal and initiated by the user is a first application request, and if the distance is greater than or equal to a first preset numeric value, the front-facing camera of the mobile terminal is turned on; or if the distance is less than a first preset numeric value, the rear-facing camera of the mobile terminal is turned on. When the photographing request received by the mobile terminal and initiated by the user is a second application request, and if the distance is greater than or equal to a second preset numeric value, the front-facing camera of the mobile terminal is turned on; or if the distance is less than a second preset numeric value, the rear-facing camera of the mobile terminal is turned on. The first preset numeric value is different from the second preset numeric value.

Certainly, in an actual application, the photographing request initiated by the user may not only include the first application request and the second application request, but may also include a third application request, a fourth application request, a fifth application request, or the like. Except for the first application request and the second application request, all or some of preset numeric values corresponding to other application requests may be the same, or the preset numeric values may be different from each other, which is not limited herein.

Step 504. The mobile terminal acquires information about the user's usage of the front-facing camera and the rear-facing camera, and adjusts the preset numeric value according to the usage information.

The mobile terminal acquires information about the user's usage of the front-facing camera and the rear-facing camera, where the usage information includes all records about the user's usage of the front-facing camera and the rear-facing camera, for example, frequency of using the front-facing camera and the rear-facing camera separately, frequency of switching from one camera to the other camera by the user, and distances between the mobile terminal and the user when the user uses the front-facing camera and the rear-facing camera separately. After acquiring the information about the user's usage of the front-facing camera and the rear-facing camera, the mobile terminal performs calculation and analysis according to the usage information, and adjusts the preset numeric value according to a result of the analysis.

For example, the mobile terminal determines values of all distances between the mobile terminal and the user in the usage record or determines some sample values, and calculates a probability of using the front-facing camera by the user and a probability of using the rear-facing camera that correspond to each determined distance value, and then finds out all target distances that correspond to a case in which a difference between a probability of using the front-facing camera and a probability of using the rear-facing camera is less than or equal to 0, and adjusts the preset numeric value to one of all the target distances. For a specific example, the mobile terminal determines that values of all distances between the mobile terminal and the user in the usage record range from 0 centimeter (cm) to 60 cm. When the distance value is 30 cm, a probability of using the rear-facing camera is 95%, and a probability of using the front-facing camera is 5%; when the distance is 40 cm, a probability of using the rear-facing camera is 40%, and a probability of using the front-facing camera is 60%; and when the distance is 50 cm, a probability of using the rear-facing camera is 30%, and a probability of using the front-facing camera is 70%. Therefore, the preset numeric value may be adjusted to 40 cm. Alternatively, in all distance values, probabilities of using the front-facing camera are all lower than 5%, it indicates that the user rarely uses the front-facing camera, and therefore, the preset numeric value may be set to a large value, for example, may be equal to 0.95 times the length of the arm.

For another example, when the mobile terminal determines, according to the distance between the mobile terminal and the user, whether to turn on the front-facing camera or the rear-facing camera, after it is determined to turn on the front-facing camera or the rear-facing camera and before the front-facing camera or the rear-facing camera is turned on, the mobile terminal further sends an inquiry request to the user, where the inquiry request is used to ask the user whether to agree to turn on the camera; if the user agrees to turn on the camera or no reply is received within a preset time period, the mobile terminal continues to turn on the camera; or if the user refuses to turn on the camera, in the first case, the mobile terminal continues to turn on a default camera, and in the second case, the mobile terminal continues to use an original camera. In addition, the mobile terminal performs statistical analysis on feedback from the user. If an agreement probability exceeds 50% when the mobile terminal asks the user whether to turn on the front-facing camera and an agreement probability is lower than 50% when the mobile terminal asks the user whether to turn on the rear-facing camera, the mobile terminal increases the preset numeric value by a pre-determined value.

It should be noted that, the foregoing description is merely an example, and is not limited herein.

Certainly, in an actual application, before the mobile terminal performs analysis and calculation on the usage information of the front-facing camera and the rear-facing camera, the mobile terminal may further classify the usage information of the two cameras, where usage information, of the front-facing camera and the rear-facing camera, corresponding to each type of photographing request is classified as the same type, and then analysis and calculation are performed on each type of usage information, so as to separately adjust preset numeric values corresponding to different photographing requests.

The mobile terminal may update the usage information of the front-facing camera and the rear-facing camera at preset intervals, or may update the usage information each time after the camera is used, which is not limited herein. Likewise, the mobile terminal may adjust the preset numeric value at preset intervals, or may adjust the preset numeric value each time after the camera is used, which is not limited herein.

In this embodiment, the mobile terminal acquires information about the user's usage of the front-facing camera and the rear-facing camera, and adjusts the preset numeric value according to the usage information, so that the mobile terminal can automatically turn on the front-facing camera or the rear-facing camera more accurately according to an actual situation, thereby improving user experience.

Figure 6:
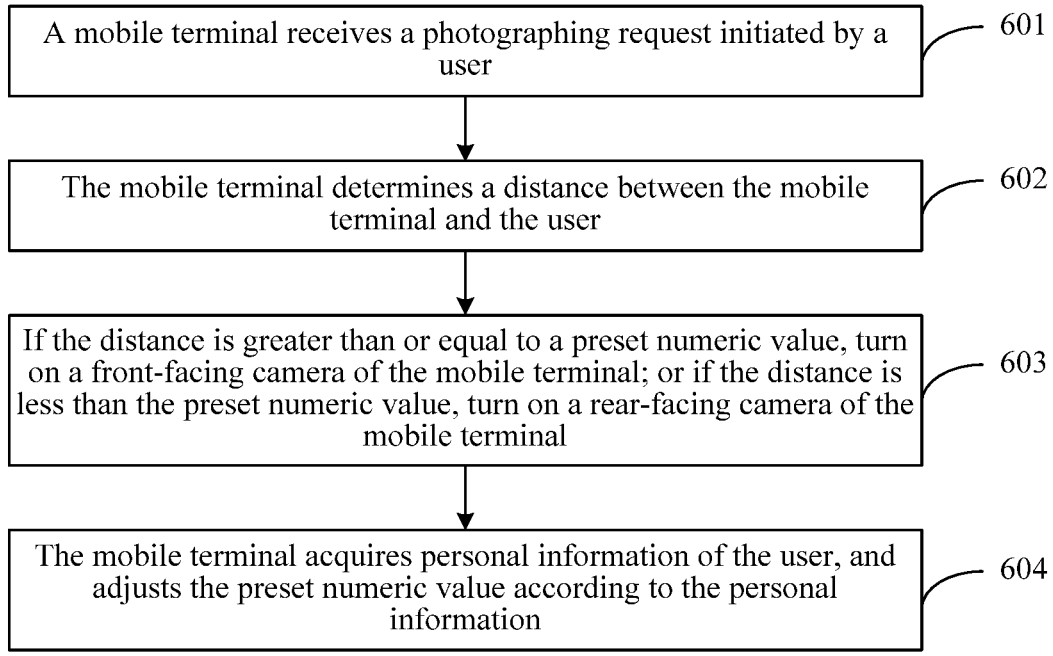
FIG. 6 is a flowchart of a method for selection between a front-facing camera and a rear-facing camera of a mobile terminal according to another embodiment of the present disclosure.

In the foregoing embodiment, the preset numeric value set by the mobile terminal by default is adjusted according to the information about the user's usage of the front-facing camera and the rear-facing camera. In an actual application, the mobile terminal may adjust the preset numeric value according to personal information of the user, and the following describes a method for selection between a front-facing camera and a rear-facing camera of a mobile terminal according to an embodiment of the present disclosure. Referring to FIG. 6, another embodiment of a method for selection between a front-facing camera and a rear-facing camera of a mobile terminal according to an embodiment of the present disclosure includes the following steps.

Step 601. A mobile terminal receives a photographing request initiated by a user.

The mobile terminal may be a mobile phone, a tablet computer, or another mobile terminal having a camera, where a front-facing camera and a rear-facing camera are disposed on the mobile terminal, the front-facing camera refers to a camera that is located at a same side as a display screen of the mobile terminal, and the rear-facing camera refers to a camera that is located at the other side of the mobile terminal opposite to the display screen of the mobile terminal. When a user needs to take a picture, the user may trigger a photographing function of the mobile terminal. The mobile terminal receives a photographing request initiated by the user, and prepares to turn on a camera to enter a photographing state. The photographing request includes at least a first application request and a second application request. For a specific example, the photographing request includes a video-shooting request and a picture-taking request, or further includes a video call request. Certainly, the foregoing description is merely an example, and is not limited herein.

Step 602. The mobile terminal determines a distance between the mobile terminal and the user.

A distance measurement module that can measure a distance between the mobile terminal and the user is disposed in the mobile terminal, where the distance measurement module may be an independently disposed distance sensor or proximity sensor, or may be a distance sensor that is configured in the camera of the mobile terminal to implement an automatic focus function. Certainly, in an actual application, the distance measurement module may be another sensor or module that can implement the same function.

It should be noted that, there are two cases herein. In a first case, the camera of the mobile terminal is off when the user initiates the photographing request to the mobile terminal. The mobile terminal determines a distance between the mobile terminal and the user when the user initiates the photographing request to the mobile terminal, so as to determine, according to the distance, whether to turn on the front-facing camera or turn on the rear-facing camera. The mobile terminal may first turn on a default camera after receiving the photographing request initiated by the user, and then determine, according to the distance, whether to switch to or additionally turn on the front-facing camera or the rear-facing camera, or directly determine, according to the distance, whether to turn on the front-facing camera or the rear-facing camera, which is not limited herein.

In the first case, the distance measurement module may detect the distance between the mobile terminal and the user all the time, and when receiving the photographing request initiated by the user, the mobile terminal determines a current distance according to the distance measurement module thereof; or the distance measurement module detects the distance between the mobile terminal and the user only when the screen is on, and when receiving the photographing request initiated by the user, the mobile terminal determines a current distance according to the distance measurement module thereof; or the distance measurement module may detect a current distance between the mobile terminal and the user only when the mobile terminal receives the photographing request initiated by the user, and the mobile terminal determines, according to the distance measurement module thereof, the distance measured by the distance measurement module.

In a second case, when receiving the photographing request initiated by the user, the mobile terminal is currently in a photographing state. In a whole photographing process of the mobile terminal, the distance measurement module detects the distance between the mobile terminal and the user in real time, and the mobile terminal determines a current distance according to the distance measurement module thereof.

It should be noted that, in the foregoing description, the distance, between the mobile terminal and the user, measured by the distance measurement module may be an instantaneous value that is currently measured between the mobile terminal and the user, or may be an average value or a sample value of distances between the mobile terminal and the user within preset duration. Certainly, the foregoing description is merely an example, and is not limited herein.

Step 603. If the distance is greater than or equal to a preset numeric value, turn on a front-facing camera of the mobile terminal; or if the distance is less than a preset numeric value, turn on a rear-facing camera of the mobile terminal.

In this embodiment, the preset numeric value is set by the mobile terminal by default. For a specific example, the mobile terminal may set, by default, the preset numeric value to 0.7 times to 1 times an average arm length of adults in a sales territory of the mobile terminal.

When the user initiates different photographing requests, cases in which the user uses the front-facing camera and the rear-facing camera separately may be different. Therefore, preferably, in this embodiment, when it is determined, according to whether the distance is less than the preset numeric value, whether to turn on the front-facing camera or the rear-facing camera, for different photographing requests, preset numeric values set by the mobile terminal by default are different. When the photographing request received by the mobile terminal and initiated by the user is a first application request, and if the distance is greater than or equal to a first preset numeric value, the front-facing camera of the mobile terminal is turned on; or if the distance is less than a first preset numeric value, the rear-facing camera of the mobile terminal is turned on. When the photographing request received by the mobile terminal and initiated by the user is a second application request, and if the distance is greater than or equal to a second preset numeric value, the front-facing camera of the mobile terminal is turned on; or if the distance is less than a second preset numeric value, the rear-facing camera of the mobile terminal is turned on. The first preset numeric value is different from the second preset numeric value.

Certainly, in an actual application, the photographing request initiated by the user may not only include the first application request and the second application request, but may also include a third application request, a fourth application request, a fifth application request, or the like. Except for the first application request and the second application request, all or some of preset numeric values corresponding to other application requests may be the same, or the preset numeric values may be different from each other, which is not limited herein.

Certainly, in an actual application, the preset numeric values that are set by the mobile terminal by default and correspond to the different photographing requests initiated by the user may be all the same, which is not limited herein.

Step 604. The mobile terminal acquires personal information of the user, and adjusts the preset numeric value according to the personal information.

The mobile terminal may acquire the personal information of the user from storage of an application program inside the mobile terminal or from an operator, or the user may enter the personal information. Certainly, in an actual application, the mobile terminal may acquire the personal information of the user from another source. Examples are merely described herein, and are not limited. The personal information of the user that is acquired by the mobile terminal may include information such as age, height, arm length, and gender of the user. After acquiring the personal information of the user, the mobile terminal adjusts the preset numeric value according to the personal information. For example, if the user is female, because self-photographing probabilities of females are high, the mobile terminal may reduce the preset numeric value by a pre-determined value; or if the user is over 50 years old, a self-photographing probability of the user is low, and therefore, the mobile terminal may increase the preset numeric value by a pre-determined value; or if the arm length of the user is 56 cm, a multiple (for example, 0.7 times) of the arm length of the user may be used as the preset numeric value. Certainly, the foregoing description is merely an example, and is not limited herein.

In this embodiment, the mobile terminal acquires personal information of the user, and adjusts the preset numeric value according to the personal information, so that the mobile terminal can automatically turn on the front-facing camera or the rear-facing camera more accurately according to a personal actual situation of the user, thereby improving user experience.

Figure 7:
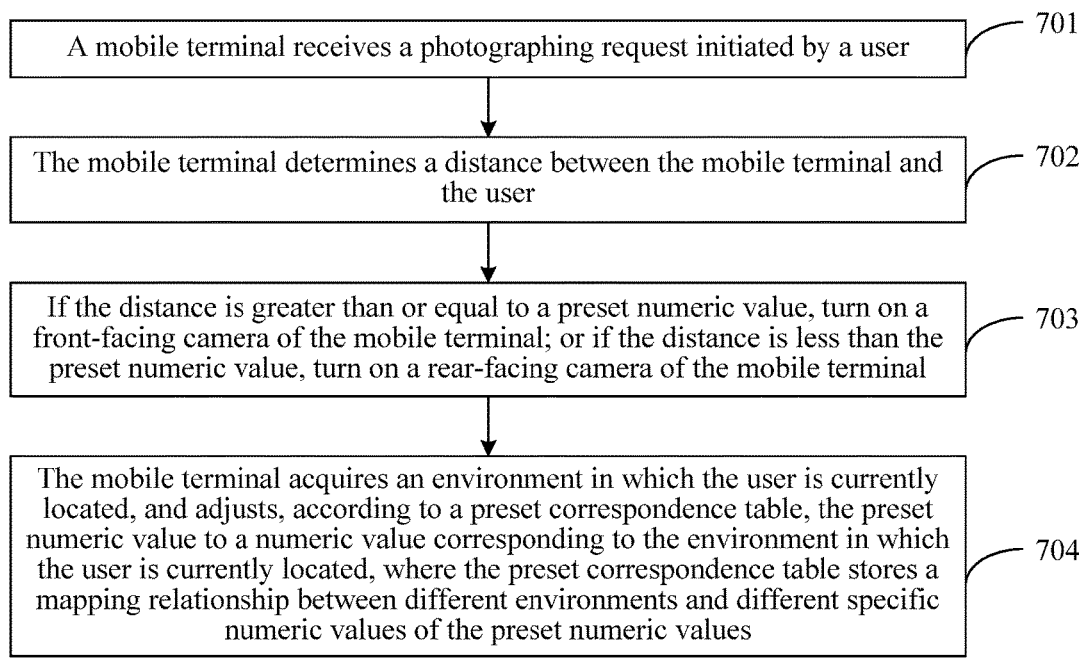
FIG. 7 is a flowchart of a method for selection between a front-facing camera and a rear-facing camera of a mobile terminal according to another embodiment of the present disclosure.

In the foregoing embodiment, the preset numeric value set by the mobile terminal by default is adjusted according to the personal information of the user. In an actual application, the mobile terminal may adjust the preset numeric value according to a factor of an environment in which the user is currently located, and the following describes a method for selection between a front-facing camera and a rear-facing camera of a mobile terminal according to an embodiment of the present disclosure. Referring to FIG. 7, another embodiment of a method for selection between a front-facing camera and a rear-facing camera of a mobile terminal according to an embodiment of the present disclosure includes the following steps.

Step 701. A mobile terminal receives a photographing request initiated by a user.

The mobile terminal may be a mobile phone, a tablet computer, or another mobile terminal having a camera, where a front-facing camera and a rear-facing camera are disposed on the mobile terminal, the front-facing camera refers to a camera that is located at a same side as a display screen of the mobile terminal, and the rear-facing camera refers to a camera that is located at the other side of the mobile terminal opposite to the display screen of the mobile terminal. When a user needs to take a picture, the user may trigger a photographing function of the mobile terminal. The mobile terminal receives a photographing request initiated by the user, and prepares to turn on a camera to enter a photographing state. The photographing request includes at least a first application request and a second application request. For a specific example, the photographing request includes a video-shooting request and a picture-taking request, or further includes a video call request. Certainly, the foregoing description is merely an example, and is not limited herein.

Step 702. The mobile terminal determines a distance between the mobile terminal and the user.

A distance measurement module that can measure a distance between the mobile terminal and the user is disposed in the mobile terminal, where the distance measurement module may be an independently disposed distance sensor or proximity sensor, or may be a distance sensor that is configured in the camera of the mobile terminal to implement an automatic focus function. Certainly, in an actual application, the distance measurement module may be another sensor or module that can implement the same function.

It should be noted that, there are two cases herein. In a first case, the camera of the mobile terminal is off when the user initiates the photographing request to the mobile terminal. The mobile terminal determines a distance between the mobile terminal and the user when the user initiates the photographing request to the mobile terminal, so as to determine, according to the distance, whether to turn on the front-facing camera or turn on the rear-facing camera. The mobile terminal may first turn on a default camera after receiving the photographing request initiated by the user, and then determine, according to the distance, whether to switch to or additionally turn on the front-facing camera or the rear-facing camera, or directly determine, according to the distance, whether to turn on the front-facing camera or the rear-facing camera, which is not limited herein.

In the first case, the distance measurement module may detect the distance between the mobile terminal and the user all the time, and when receiving the photographing request initiated by the user, the mobile terminal determines a current distance according to the distance measurement module thereof; or the distance measurement module detects the distance between the mobile terminal and the user only when the screen is on, and when receiving the photographing request initiated by the user, the mobile terminal determines a current distance according to the distance measurement module thereof; or the distance measurement module may detect a current distance between the mobile terminal and the user only when the mobile terminal receives the photographing request initiated by the user, and the mobile terminal determines, according to the distance measurement module thereof, the distance measured by the distance measurement module.

In a second case, when receiving the photographing request initiated by the user, the mobile terminal is currently in a photographing state. In a whole photographing process of the mobile terminal, the distance measurement module detects the distance between the mobile terminal and the user in real time, and the mobile terminal determines a current distance according to the distance measurement module thereof.

It should be noted that, in the foregoing description, the distance, between the mobile terminal and the user, measured by the distance measurement module may be an instantaneous value that is currently measured between the mobile terminal and the user, or may be an average value or a sample value of distances between the mobile terminal and the user within preset duration. Certainly, the foregoing description is merely an example, and is not limited herein.

Step 703. If the distance is greater than or equal to a preset numeric value, turn on a front-facing camera of the mobile terminal; or if the distance is less than a preset numeric value, turn on a rear-facing camera of the mobile terminal.

In this embodiment, the preset numeric value is set by the mobile terminal by default. For a specific example, the mobile terminal may set, by default, the preset numeric value to 0.7 times to 1 times an average arm length of adults in a sales territory of the mobile terminal.

When the user initiates different photographing requests, cases in which the user uses the front-facing camera and the rear-facing camera separately may be different. Therefore, preferably, in this embodiment, when it is determined, according to whether the distance is less than the preset numeric value, whether to turn on the front-facing camera or the rear-facing camera, for different photographing requests, preset numeric values set by the mobile terminal by default are different. When the photographing request received by the mobile terminal and initiated by the user is a first application request, and if the distance is greater than or equal to a first preset numeric value, the front-facing camera of the mobile terminal is turned on; or if the distance is less than a first preset numeric value, the rear-facing camera of the mobile terminal is turned on. When the photographing request received by the mobile terminal and initiated by the user is a second application request, and if the distance is greater than or equal to a second preset numeric value, the front-facing camera of the mobile terminal is turned on; or if the distance is less than a second preset numeric value, the rear-facing camera of the mobile terminal is turned on. The first preset numeric value is different from the second preset numeric value.

Certainly, in an actual application, the photographing request initiated by the user may not only include the first application request and the second application request, but may also include a third application request, a fourth application request, a fifth application request, or the like. Except for the first application request and the second application request, all or some of preset numeric values corresponding to other application requests may be the same, or the preset numeric values may be different from each other, which is not limited herein.

Certainly, in an actual application, the preset numeric values that are set by the mobile terminal by default and correspond to the different photographing requests initiated by the user may be all the same, which is not limited herein.

Step 704. The mobile terminal acquires a factor of an environment in which the user is currently located, and adjusts the preset numeric value according to the factor of the environment in which the user is currently located.

The mobile terminal may acquire, using a detector disposed therein or another sensing module, a factor of an environment in which the user is currently located, where the factor of the environment in which the user is currently located may include environmental factors such as a light intensity or a temperature of the environment in which the user is currently located, or whether the user is inside a room or outside a room, or motion status of the environment in which the user is located, and adjust the preset numeric value according to the different environmental factors. For a specific example, an initial value of the preset numeric value set by the mobile terminal corresponds to a preset reference value of a light intensity. When the mobile terminal receives the photographing request initiated by the user, the mobile terminal detects a light intensity of the environment in which the user is currently located, and adjusts the preset numeric value to a pre-determined value according to a preset table. A one-to-one correspondence between different light intensities and different specific numeric values of the preset numeric values is set in the preset table, where a smaller light intensity corresponds to a smaller preset numeric value.

In this embodiment, the mobile terminal acquires a factor of an environment in which the user is currently located, and adjusts the preset numeric value according to the factor of the environment in which the user is currently located, so that the mobile terminal can automatically turn on the front-facing camera or the rear-facing camera more accurately according to a personal actual situation of the user, thereby improving user experience.

Certainly, in an actual application, the preset numeric value may not be set by the mobile terminal by default, and may be manually entered by the user. In this way, the user may set the preset numeric value according to an actual situation of the user, so that the mobile terminal can automatically turn on the front-facing camera or the rear-facing camera more accurately according to a personal actual situation of the user, thereby improving user experience.

In all the foregoing embodiments, when a mobile terminal determines, according to a distance between the mobile terminal and a user, whether to turn on a front-facing camera or a rear-facing camera, after it is determined to turn on the front-facing camera or the rear-facing camera and before the front-facing camera or the rear-facing camera is turned on, the mobile terminal further sends an inquiry request to the user, where the inquiry request is used to ask the user whether to agree to turn on the camera; if the user agrees to turn on the camera or no reply is received within a preset time period, the mobile terminal triggers the turning on of the camera; or if the user refuses to turn on the camera, the mobile terminal triggers a default action of the mobile terminal. In a first case, the default action is continuing to turn on a default camera of the mobile terminal, and in a second case, the default action is continuing to use an original camera. When sending the inquiry request to the user, the mobile terminal may ask the user by displaying text on a pop-up window that appears on a screen; or the mobile terminal may ask, by emitting voice, the user whether to agree to turn on the camera. The user may respond to the inquiry from the mobile terminal by tapping a preset area on the screen of the mobile terminal, or using a voice command, or by shaking the terminal, or by pressing a physical button or a virtual button on the mobile terminal. Certainly, the foregoing description is merely an example, and is not limited herein.

Alternatively, the mobile terminal may not ask the user, but directly notify the user that the front-facing camera or the rear-facing camera is turned on. For example, the mobile terminal may notify the user by displaying text or an image or another flag on the screen, or notify the user by making a sound or vibrating. Certainly, the foregoing description is merely an example, and is not limited herein.

For ease of understanding, the following describes the method for selection between a front-facing camera and a rear-facing camera of a mobile terminal according to this embodiment using an actual application scenario.

It is set by a mobile phone by default that an initial value of a preset numeric value is 35 cm. A camera of the mobile phone is currently off. The mobile phone receives a picture-taking request initiated by a user, and a distance measurement module in the mobile phone detects a current distance between the camera of the mobile phone and the nose of the user. The mobile phone determines, according to the distance measurement module, that a distance detected by the distance measurement module is 40 cm.

The mobile phone determines that the distance is greater than the preset numeric value set by the mobile phone by default, and asks, using voice, the user whether to agree to turn on a front-facing camera of the mobile phone. After acquiring a voice command from the user, the mobile phone analyzes the voice command, identifies that the user agrees to turn on the front-facing camera, and then turns on the front-facing camera of the mobile phone.

In addition, the mobile phone updates information, which is stored in the mobile phone, about the user's usage of the front-facing camera and the rear-facing camera, where data after update is as follows: when the distance between the camera of the mobile phone and the nose of the user is 35 cm, a probability of using the rear-facing camera is 60%, and a probability of using the front-facing camera is 40%; when the distance is 40 cm, a probability of using the rear-facing camera is 52%, and a probability of using the front-facing camera is 48%; and when the distance is 45 cm, a probability of using the rear-facing camera is 60%, and a probability of using the front-facing camera is 40%. Therefore, the mobile phone adjusts a specific numeric value of the preset numeric value to 40 cm.

Figure 8:
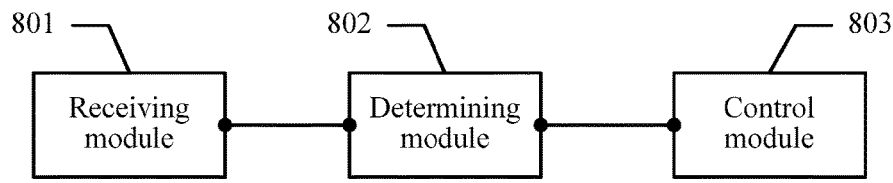
FIG. 8 is a schematic diagram of a mobile terminal according to an embodiment of the present disclosure.

The method for selection between a front-facing camera and a rear-facing camera of a mobile terminal according to the embodiments of the present disclosure is described above, and the following describes a mobile terminal in an embodiment of the present disclosure. Referring to FIG. 8, an embodiment of a mobile terminal in this embodiment of the present disclosure includes a front-facing camera and a rear-facing camera; a receiving module 801 configured to receive a photographing request initiated by a user; a determining module 802 configured to determine a distance between the mobile terminal and the user; and a control module 803 configured to, when the distance is greater than or equal to a preset numeric value, turn on the front-facing camera of the mobile terminal; or when the distance is less than a preset numeric value, turn on the rear-facing camera of the mobile terminal.

In this embodiment, a mobile terminal determines, using a control module, whether a distance between the mobile terminal and a user is greater than a preset numeric value, so as to automatically determine whether to turn on a front-facing camera of the mobile terminal or turn on a rear-facing camera of the mobile terminal, thereby implementing automatic selection between the front-facing camera and the rear-facing camera of the mobile terminal, avoiding a case in which the user needs to perform manual selection, and improving user experience for the mobile terminal.

In the foregoing embodiment, the distance between the mobile terminal and the user may be a distance between the mobile terminal and a face of the user. The distance may be a distance between the mobile terminal and a specific preset position on the face of the user, for example, the distance is a distance between the mobile terminal and a central point between the two eyes of the user, or a distance between the mobile terminal and the nose of the user; or the distance may be an overall distance between the mobile terminal and at least two preset positions on the face of the user, for example, the distance is equal to an average value of distances between the mobile terminal and the two eyes of the user, or an average value of distances between the mobile terminal and the five sense organs of the user. Certainly, the foregoing description is merely an example, and is not limited herein.

Certainly, in an actual application, the distance may not be the determined distance between the mobile terminal and the face of the user, but may be a distance between the mobile terminal and another portion of the user, which is not limited herein. Preferably, the mobile terminal may receive a setting by the user for a specific definition of the distance.

In an actual application, the determining a distance between the mobile terminal and a face of the user may be determining a distance between a camera of the mobile terminal and the face of the user, or determining a distance between another position on the mobile terminal and the face of the user, or determining an overall distance between at least two positions on the mobile terminal and the face of the user, which is not limited herein.

In the foregoing embodiment, the control module is configured to, when the determined distance is greater than or equal to the preset numeric value, turn on the front-facing camera; or when the distance is less than the preset numeric value, turn on the rear-facing camera. In an actual application, the preset numeric value may be set by the mobile terminal by default. Preferably, the photographing request received by the receiving module includes at least a first application request and a second application request; when the photographing request is the first application request, the preset numeric value is a first preset numeric value; and when the photographing request is the second application request, the preset numeric value is a second preset numeric value, where the first preset numeric value is different from the second preset numeric value. In this way, the mobile terminal can set different preset numeric values by default for different photographing requests, so that the mobile terminal can automatically turn on the front-facing camera or the rear-facing camera more flexibly according to an actual situation, thereby improving user experience. Certainly, in an actual application, the preset numeric values that are set by the mobile terminal by default and correspond to the different photographing requests initiated by the user may be all the same, which is not limited herein.

Figure 9:
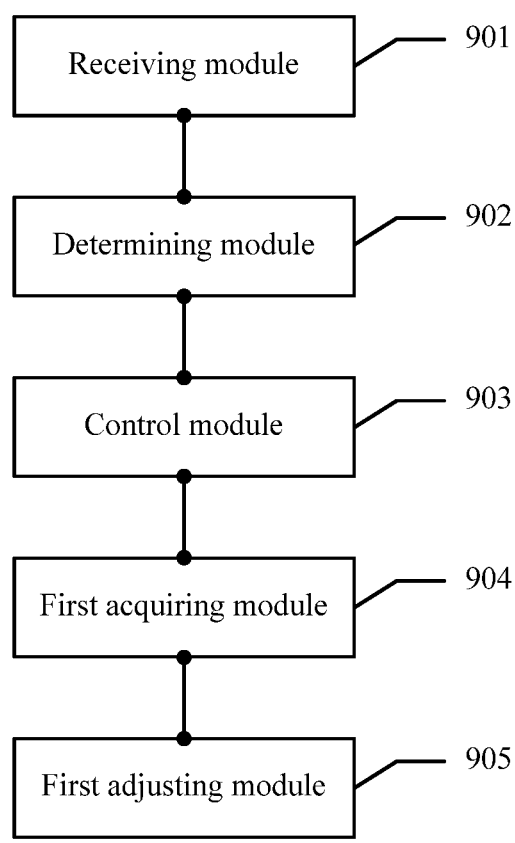
FIG. 9 is a schematic diagram of a mobile terminal according to another embodiment of the present disclosure.

In an actual application, when the mobile terminal separately adjusts the first preset numeric value and the second preset numeric value, so that the two preset numeric values are different, the adjustment may be performed according to probabilities of using the front-facing camera separately in a first application state and a second application state of the camera. The following describes the mobile terminal in an embodiment of the present disclosure. Referring to FIG. 9, another embodiment of a mobile terminal according to this embodiment of the present disclosure includes a front-facing camera and a rear-facing camera; a receiving module 901 configured to receive a photographing request initiated by a user; a determining module 902 configured to determine a distance between the mobile terminal and the user; and a control module 903 configured to, when the distance is greater than or equal to a preset numeric value, turn on the front-facing camera of the mobile terminal; or when the distance is less than a preset numeric value, turn on the rear-facing camera of the mobile terminal.

In this embodiment, the mobile terminal further includes a first acquiring module 904 configured to acquire a first probability and a second probability, where the first probability is a probability of using the front-facing camera by the user in a first application state, and the second probability is a probability of using the front-facing camera by the user in a second application state; and a first adjusting module 905 configured to separately adjust a first preset numeric value and a second preset numeric value according to the first probability and the second probability, so that the first probability corresponds to the first preset numeric value and the second probability corresponds to the second preset numeric value.

In this embodiment, the mobile terminal sets, according to different probabilities of using the front-facing camera in different application states of the camera, preset numeric values corresponding to the different application states, so that the mobile terminal can automatically turn on the front-facing camera or the rear-facing camera more flexibly according to an actual situation, thereby improving user experience.

Figure 10:
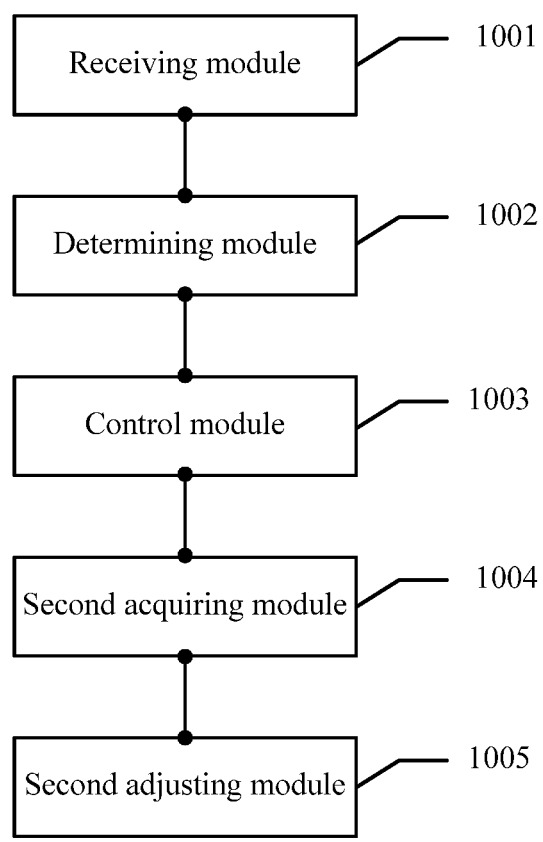
FIG. 10 is a schematic diagram of a mobile terminal according to another embodiment of the present disclosure.

In the foregoing embodiment, the preset numeric values set by the mobile terminal by default are adjusted separately according to the first probability and the second probability. In an actual application, the mobile terminal may adjust the preset numeric value using another method, and the following describes the mobile terminal according to an embodiment of the present disclosure. Referring to FIG. 10, another embodiment of a mobile terminal according to this embodiment of the present disclosure includes a front-facing camera and a rear-facing camera; a receiving module 1001 configured to receive a photographing request initiated by a user; a determining module 1002 configured to determine a distance between the mobile terminal and the user; and a control module 1003 configured to, when the distance is greater than or equal to a preset numeric value, turn on the front-facing camera of the mobile terminal; or when the distance is less than a preset numeric value, turn on the rear-facing camera of the mobile terminal.

In this embodiment, the mobile terminal further includes a second acquiring module 1004 configured to acquire information about the user's usage of the front-facing camera and the rear-facing camera; and a second adjusting module 1005 configured to adjust the preset numeric value according to the usage information.

In this embodiment, the mobile terminal acquires information about the user's usage of the front-facing camera and the rear-facing camera, and adjusts the preset numeric value according to the usage information, so that the mobile terminal can automatically turn on the front-facing camera or the rear-facing camera more accurately according to an actual situation, thereby improving user experience.

Figure 11:
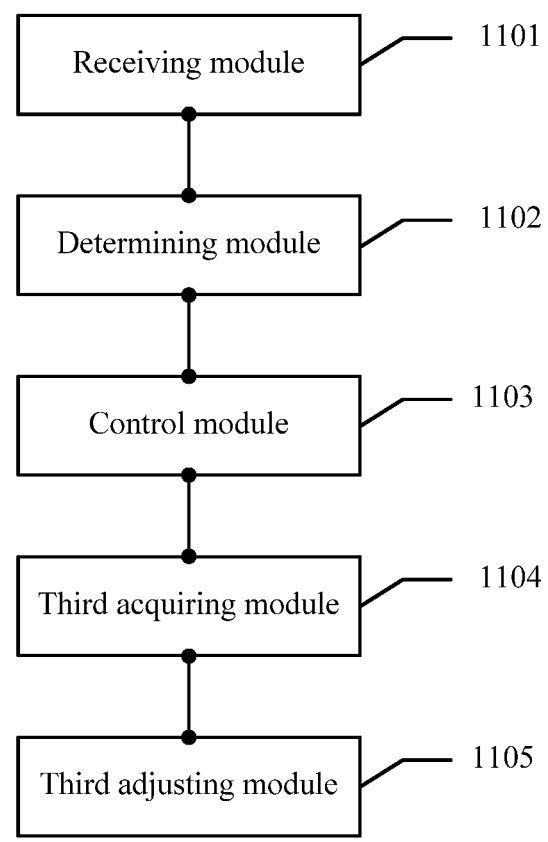
FIG. 11 is a schematic diagram of a mobile terminal according to another embodiment of the present disclosure.

In the foregoing embodiment, the mobile terminal adjusts, according to the information about the user's usage of the front-facing camera and the rear-facing camera, the preset numeric value set by the mobile terminal by default. In an actual application, the mobile terminal may further adjust the preset numeric value using personal information of the user, and the following describes the mobile terminal according to an embodiment of the present disclosure. Referring to FIG. 11, another embodiment of a mobile terminal according to this embodiment of the present disclosure includes a front-facing camera and a rear-facing camera; a receiving module 1101 configured to receive a photographing request initiated by a user; a determining module 1102 configured to determine a distance between the mobile terminal and the user; and a control module 1103 configured to, when the distance is greater than or equal to a preset numeric value, turn on the front-facing camera of the mobile terminal; or when the distance is less than a preset numeric value, turn on the rear-facing camera of the mobile terminal.

In this embodiment, the mobile terminal further includes a third acquiring module 1104 configured to acquire personal information of the user, and adjust the preset numeric value according to the personal information; and a third adjusting module 1105 configured to adjust the preset numeric value according to the personal information.

In this embodiment, the mobile terminal acquires personal information of the user, and adjusts the preset numeric value according to the personal information, so that the mobile terminal can automatically turn on the front-facing camera or the rear-facing camera more accurately according to a personal actual situation of the user, thereby improving user experience.

Figure 12:
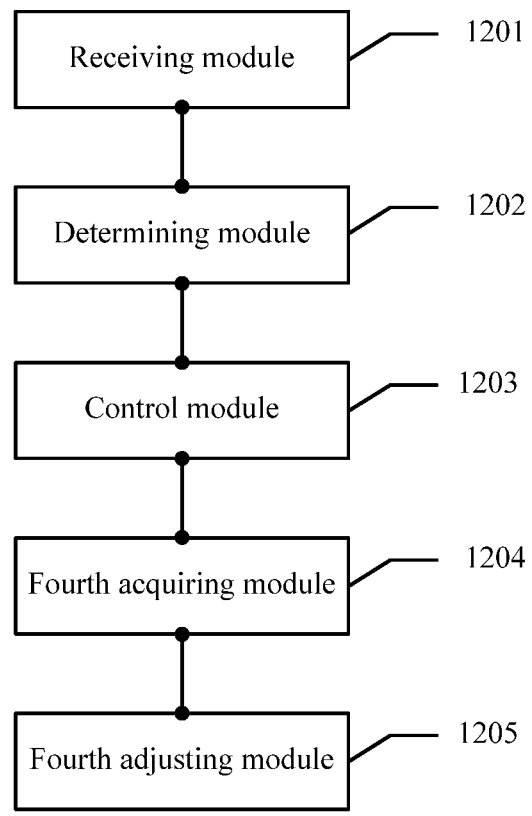
FIG. 12 is a schematic diagram of a mobile terminal according to another embodiment of the present disclosure.

In the foregoing embodiment, the mobile terminal adjusts, according to the personal information of the user, the preset numeric value set by the mobile terminal by default. In an actual application, the mobile terminal may further adjust the preset numeric value according to an environment in which the user is currently located, and the following describes the mobile terminal according to an embodiment of the present disclosure. Referring to FIG. 12, another embodiment of a mobile terminal according to this embodiment of the present disclosure includes a front-facing camera and a rear-facing camera; a receiving module 1201 configured to receive a photographing request initiated by a user; a determining module 1202 configured to determine a distance between the mobile terminal and the user; and a control module 1203 configured to, when the distance is greater than or equal to a preset numeric value, turn on the front-facing camera of the mobile terminal; or when the distance is less than a preset numeric value, turn on the rear-facing camera of the mobile terminal.

In this embodiment, the mobile terminal further includes a fourth acquiring module 1204 configured to acquire a factor of an environment in which the user is currently located; and a fourth adjusting module 1205 configured to adjust the preset numeric value according to the factor of the environment in which the user is currently located.

In this embodiment, the mobile terminal acquires a factor of an environment in which the user is currently located, and adjusts the preset numeric value according to the factor of the environment in which the user is currently located, so that the mobile terminal can automatically turn on the front-facing camera or the rear-facing camera more accurately according to a personal actual situation of the user, thereby improving user experience.

Figure 13:
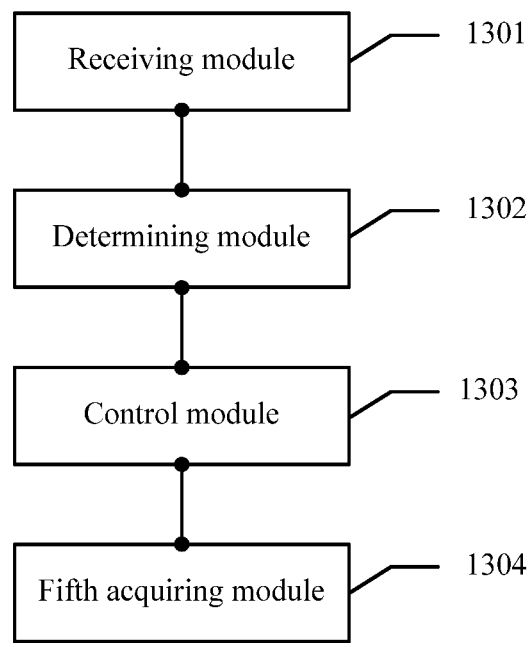
FIG. 13 is a schematic diagram of a mobile terminal according to another embodiment of the present disclosure.

In the foregoing embodiment, the preset numeric value is set by the mobile terminal by default. In an actual application, the preset numeric value may be entered manually by the user, and the following describes the mobile terminal according to an embodiment of the present disclosure. Referring to FIG. 13, another embodiment of a mobile terminal according to this embodiment of the present disclosure includes a front-facing camera and a rear-facing camera; a receiving module 1301 configured to receive a photographing request initiated by a user; a determining module 1302 configured to determine a distance between the mobile terminal and the user; and a control module 1303 configured to, when the distance is greater than or equal to a preset numeric value, turn on the front-facing camera of the mobile terminal; or when the distance is less than a preset numeric value, turn on the rear-facing camera of the mobile terminal.

In this embodiment, the mobile terminal further includes a fifth acquiring module 1304 configured to acquire the preset numeric value entered by the user.

In this embodiment, the mobile terminal may enable the user to set the preset numeric value according to an actual situation of the user, so that the mobile terminal can automatically turn on the front-facing camera or the rear-facing camera more accurately according to a personal actual situation of the user, thereby improving user experience.

Figure 14:
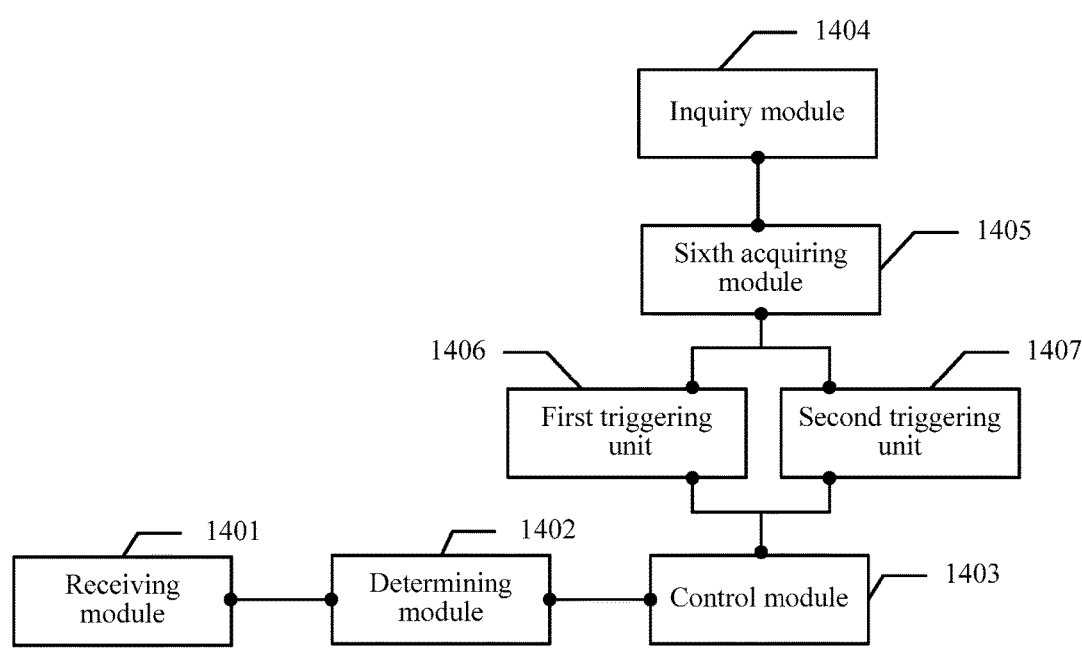
FIG. 14 is a schematic diagram of a mobile terminal according to another embodiment of the present disclosure.

In the foregoing embodiment, the mobile terminal determines, according to the distance between the mobile terminal and the user, whether to turn on the front-facing camera or the rear-facing camera. In an actual application, before the front-facing camera or the rear-facing camera is turned on, an inquiry request may further be sent to the user, and the following describes the mobile terminal according to an embodiment of the present disclosure. Referring to FIG. 14, another embodiment of a mobile terminal according to this embodiment of the present disclosure includes a front-facing camera and a rear-facing camera; a receiving module 1401 configured to receive a photographing request initiated by a user; a determining module 1402 configured to determine a distance between the mobile terminal and the user; and a control module 1403 configured to, when the distance is greater than or equal to a preset numeric value, turn on the front-facing camera of the mobile terminal; or when the distance is less than a preset numeric value, turn on the rear-facing camera of the mobile terminal.

In this embodiment, the mobile terminal further includes an inquiry module 1404 configured to send an inquiry request to the user, where the inquiry request is used to ask the user whether to agree to turn on the camera; a sixth acquiring module 1405 configured to acquire a reply from the user; a first triggering unit 1406 configured to, when the reply is agreeing to turn on the camera or no reply is received within a preset time period, trigger the turning on of the front-facing camera of the mobile terminal or the rear-facing camera of the mobile terminal; and a second triggering unit 1407 configured to, when the reply is refusing to turn on the camera, trigger a default action of the mobile terminal.

In this embodiment, the mobile terminal may determine, by asking the user, whether to automatically turn on the front-facing camera or the rear-facing camera, so that the camera that is turned on can better meet a requirement of the user, thereby improving user experience.

For ease of understanding, the following describes the mobile terminal in this embodiment using an actual application scenario.

It is set by a mobile phone by default that an initial value of a preset numeric value is 35 cm. A camera of the mobile phone is currently off. A receiving module of the mobile phone receives a picture-taking request initiated by a user, and a distance measurement module in the mobile phone detects a current distance between the camera of the mobile phone and the nose of the user. A determining module of the mobile phone determines, according to the distance measurement module, that a distance detected by the distance measurement module is 40 cm.

The mobile phone determines that the distance is greater than the preset numeric value set by the mobile phone by default, and emits voice to the user using an inquiry module, to ask the user whether to agree to turn on a front-facing camera of the mobile phone. A sixth acquiring module acquires a voice command from the user. When the sixth acquiring module identifies, by analyzing the voice command, that the user agrees to turn on the camera, a first triggering unit triggers a control module to turn on the front-facing camera of the mobile phone.

In addition, a second acquiring module acquires information about the user's usage of the front-facing camera and a rear-facing camera, and updates the usage information and stores the updated usage information, where data after update is as follows: when the distance between the camera of the mobile phone and the nose of the user is 35 cm, a probability of using the rear-facing camera is 60%, and a probability of using the front-facing camera is 40%; when the distance is 40 cm, a probability of using the rear-facing camera is 52%, and a probability of using the front-facing camera is 48%; and when the distance is 45 cm, a probability of using the rear-facing camera is 60%, and a probability of using the front-facing camera is 40%. Therefore, a second adjusting module of the mobile phone adjusts a specific numeric value of the preset numeric value to 40 cm.

Figure 15:
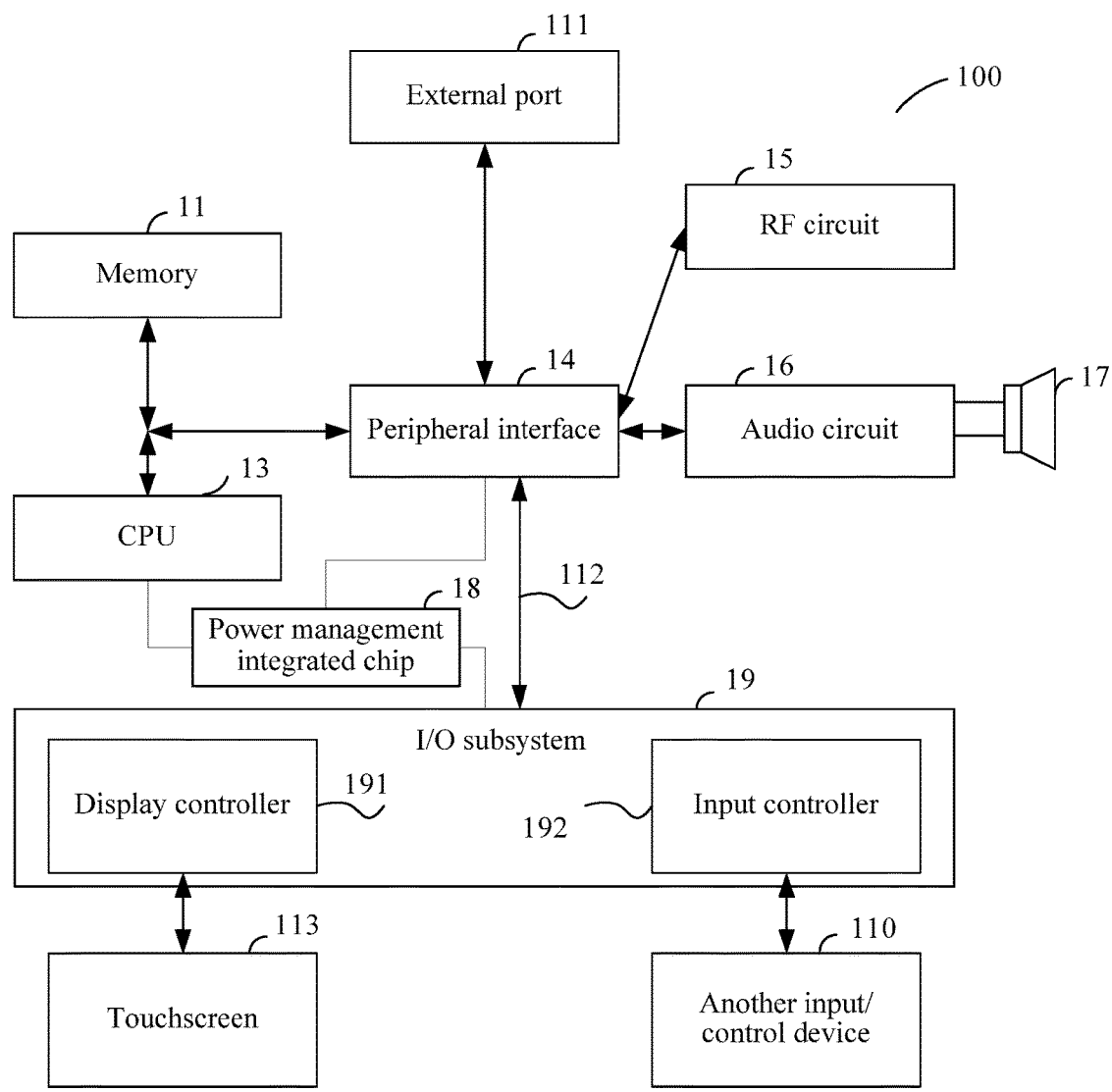
FIG. 15 is a schematic diagram of a mobile phone according to an embodiment of the present disclosure.

Referring to FIG. 15, this embodiment describes the present disclosure using a mobile phone as an example.

It should be noted that, the mobile phone 100 shown in the figure is merely an example of a mobile terminal, and the mobile phone 100 may include more components or fewer components than those shown in the figure, or two or more components may be combined, or a different component deployment may be used. The components shown in the figure may be implemented in hardware, software, or a combination of hardware and software that includes one or more signal processing and/or application-specific integrated circuits.

A mobile phone is used herein as an example for specific description. As shown in FIG. 15, a front-facing camera and a rear-facing camera are disposed on the mobile phone, and the mobile phone further includes a memory 11, a central processing unit 13 (CPU), a peripheral interface 14, a radio frequency (RF) circuit 15, an audio circuit 16, a loudspeaker 17, a power management integrated chip 18, an input/output (I/O) subsystem 19, another input/control device 110, and an external port 111, where these components communicate with each other using one or more communications buses or signal lines 112.

It should be noted that, the mobile phone provided in this embodiment is merely an example of the mobile terminal. A server involved in this embodiment of the present disclosure may include more components or fewer components than those shown in FIG. 15, or two or more components may be combined, or a different component deployment or setting may be used; and the components may be implemented in hardware, software, or a combination of hardware and software that includes one or more signal processing and/or application-specific integrated circuits.

The following describes in detail the mobile phone for information pushing according to this embodiment of the present disclosure.

The memory 11 may be accessed by the CPU 13 and the peripheral interface 14, the memory 11 may include a high-speed random access memory, and may also include a nonvolatile memory, for example, one or more magnetic storage devices, flash memories, or other nonvolatile solid-state memories.

The peripheral interface may connect input and output peripherals of a device to the CPU 13 and the memory 11.

The I/O subsystem 19 may connect the input and output peripherals on the device, for example, a touchscreen 113 (equivalent to a display in the foregoing embodiment) and the another input/control device 110, to the peripheral interface 14. The I/O subsystem 19 may include a display controller 191 and one or more input controllers 192 for controlling the another input/control device 110. The one or more input controllers 192 receive an electric signal from the another input/control device 110 or send an electrical signal to the another input/control device 110, where the another input/control device 110 may include a physical button (a press button, a rocker button, or the like), a dial, a slide switch, a joystick, an a click scroll wheel. It should be noted that, the input controller 192 may be connected to any one of the following components: a keyboard, an infrared port, a universal serial bus (USB) interface, and a pointing device such as a mouse.

The touchscreen 113 serves as an input interface and an output interface between the mobile terminal and the user, and displays an visible output to the user, where the visible output may include a picture, text, an icon, a video, and the like.

The display controller 191 in the I/O subsystem 19 receives an electrical signal from the touchscreen 113 or sends an electrical signal to the touchscreen 113. The touchscreen 113 detects a touch on the touchscreen; the display controller 191 converts the detected touch into an interaction with a user interface object displayed on the touchscreen 113, that is, a man-machine interaction, where the user interface object displayed on the touchscreen 113 may be a game running icon, an icon linked to a corresponding network, or the like. It should be noted that, the device may further include an optical mouse, where the optical mouse is a touch-sensitive surface that does not display a visible output, or an extension of a touch-sensitive surface formed by a touchscreen.

The RF circuit 15 is mainly configured to establish communication between the mobile phone and a wireless network (that is, a network side), to implement data receiving and sending between the mobile phone and the wireless network, for example, sending and receiving of a short messaging service message and an electronic-mail (E-mail). The RF circuit 15 receives and sends an RF signal, where the RF signal is also referred to as an electromagnetic signal; the RF circuit 15 converts an electric signal into an electromagnetic signal or converts an electromagnetic signal into an electric signal, and communicates with a communications network and another device using the electromagnetic signal. The RF circuit 15 may include a known circuit for performing these functions, which includes but is not limited to an antenna system, an RF transceiver, one or more amplifiers, a tuner, one or more oscillators, a digital signal processor, a CODEC chip set, a subscriber identity module (SIM), and the like.

The audio circuit 16 is mainly configured to receive audio data from the peripheral interface 14, convert the audio data into an electric signal, and send the electric signal to the loudspeaker 17.

The loudspeaker 17 is configured to restore a speech signal received by the mobile phone from the wireless network using the RF circuit 15 to sound, and play the sound to a user.

The power management integrated chip 18 is configured to supply power for hardware connected to the CPU 13, the I/O subsystem, and the peripheral interface, and perform power management.

Figure 16:
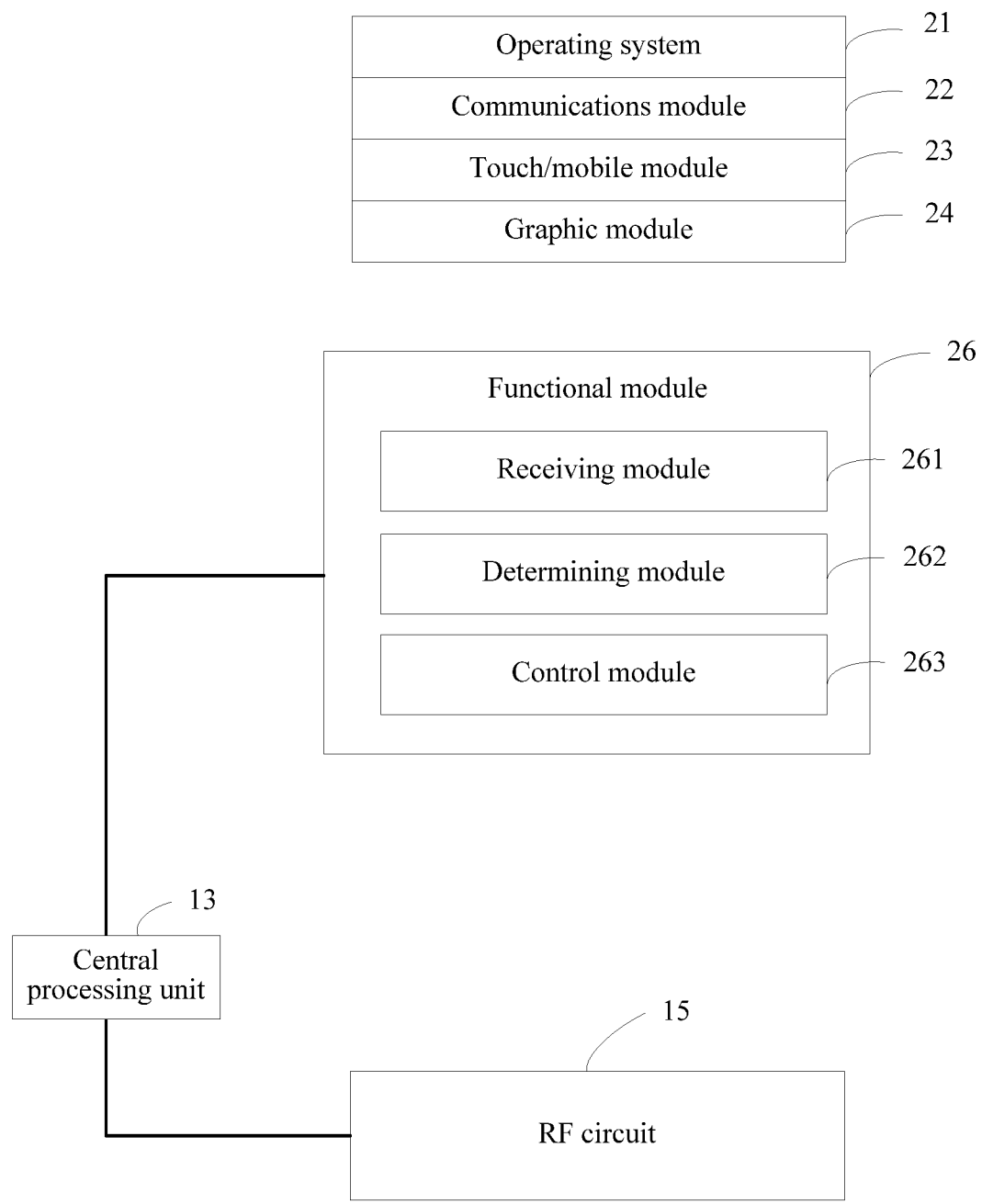
FIG. 16 is a structural diagram of an inner part of a mobile phone according to an embodiment of the present disclosure.

FIG. 16 is a structural diagram of an inner part of a mobile phone. In this embodiment of the present disclosure, a software part stored in a memory 11 may include an operating system 21, a communications module 22, a touch/mobile module 23, a graphic module 24, and a functional module 26.

The operating system 21 (for example, Darwin, RTXC, LINUX, UNIX, OS X, WINDOWS, or an embedded operating system such as VxWorks®) includes various software parts and/or drivers for controlling and managing common system tasks (for example, memory management, control over a storage device, power management, and the like), and facilitates communication between hardware parts and software parts.

The communications module 22 is configured to communicate with another device using one or more external ports 111, and further includes various software parts for processing data received by the RF circuit 15 and/or the external port 111.

The touch/mobile module 23 may detect a touch on the touchscreen 113 (combined with the display controller 191) and another touch-sensitive device (for example, a touch pad or a physical click scroll wheel). The touch/mobile module 23 includes various software parts for executing and detecting various touch-related operations, where the operations are, for example, determining whether a touch happens, determining whether the touch moves and tracing the movement on the touchscreen 113, and determining whether the touch is already discontinued (that is, whether the touch is already stopped). The determining the movement of a touch point may include determining a rate (an amplitude value), a speed (an amplitude value and a direction), and/or an acceleration (a change in the amplitude value and/or direction) of the touch point. These operations may be applied to a single touch (for example, a touch with one finger) or applied to multiple simultaneous touches (for example, "touches at multiple points"/touches with multiple fingers). In some embodiments, the touch/mobile module 23 and the display controller 191 further detect a touch on a touch pad.

The graphic module 24 includes various known software parts used for displaying an image on the touchscreen 113, including a part for changing luminosity of the displayed image, for example, a graphical user interface for receiving an instruction from the central processing unit 13 and displaying various types of software on the touchscreen 113.

The functional module 26 may include the following modules a receiving module 261 configured to receive a photographing request initiated by a user; a determining module 262 configured to determine a distance between the mobile terminal and the user; and a control module 263 configured to, when the distance is greater than or equal to a preset numeric value, turn on a front-facing camera of the mobile terminal; or when the distance is less than the preset numeric value, turn on a rear-facing camera of the mobile terminal.

The RF circuit 15 receives information sent by a network side or another device, where the message may be terminal numbers of a first user and recommendation rating calculation parameters in the foregoing embodiments. It may be understood that, the received message may be information of another type, which is not limited in this embodiment of the present disclosure. Persons skilled in the art may know that the received information may carry data of multiple data types. There may be data of only one data type, or there may be data of two or more data types.

The central processing unit 13 identifies a data type of data in the information received by the RF circuit 15; and stores, according to a correspondence list, the data to a functional module corresponding to the data type of the data, where the correspondence list is a list showing a correspondence between a data type and a function module, where the function module 26 may be a control module 263 and a determining module 262. It may be understood that, in this embodiment of the present disclosure, a manner in which the central processing unit 13 identifies data of various formats may be the manner in the foregoing embodiment, and the details are not described herein again.

The determining module 262 is configured to determine a distance between the mobile terminal and a face of the user.

The determining module 262 is configured to determine a distance between the mobile terminal and a preset position on the face of the user; or the determining module 262 is configured to determine an overall distance between the mobile terminal and at least two preset positions on the face of the user.

The preset numeric value is set by the mobile terminal by default.

The photographing request includes at least a first application request and a second application request; when the photographing request is the first application request, the preset numeric value is a first preset numeric value; and when the photographing request is the second application request, the preset numeric value is a second preset numeric value, where the first preset numeric value is different from the second preset numeric value.

The functional module further includes a first acquiring module configured to acquire a first probability and a second probability, where the first probability is a probability of using the front-facing camera by the user in a first application state, and the second probability is a probability of using the front-facing camera by the user in a second application state; and a first adjusting module configured to separately adjust the first preset numeric value and the second preset numeric value according to the first probability and the second probability, so that the first probability corresponds to the first preset numeric value and the second probability corresponds to the second preset numeric value.

The functional module further includes a second acquiring module configured to acquire information about the user's usage of the front-facing camera and the rear-facing camera; and a second adjusting module configured to adjust the preset numeric value according to the usage information.

The functional module further includes a third acquiring module configured to acquire personal information of the user, and adjust the preset numeric value according to the personal information; and a third adjusting module configured to adjust the preset numeric value according to the personal information.

The functional module further includes a fourth acquiring module configured to acquire an environment in which the user is currently located; and a fourth adjusting module configured to adjust, according to a preset correspondence table, a specific numeric value of the preset numeric value to a numeric value corresponding to the environment in which the user is currently located, where the preset correspondence table stores a mapping relationship between different environments and different specific numeric values of the preset numeric values.

The functional module further includes a fifth acquiring module configured to acquire the preset numeric value entered by the user.

The functional module further includes an inquiry module configured to send an inquiry request to the user, where the inquiry request is used to ask the user whether to agree to turn on the camera; a sixth acquiring module configured to acquire a reply from the user; a first triggering unit configured to, when the reply is agreeing to turn on the camera or no reply is received within a preset time period, trigger the control module to turn on the front-facing camera of the mobile terminal or the rear-facing camera of the mobile terminal; and a second triggering unit configured to, when the reply is refusing to turn on the camera, trigger a default action of the mobile terminal.

In this embodiment of the present disclosure, a calculation module calculates, according to recommendation rating calculation parameters, a recommendation rating of each terminal number of a first user, and a sending module sends each recommendation rating to a second user, so that the second user selects to call a terminal number with the highest recommendation rating, so as to accurately and efficiently select a number to be called, and avoid a call failure operation.

In the foregoing embodiments of the present disclosure, the server includes, but is not limited to, a server of a mobile communications device such as a mobile phone, a personal digital assistant (PDA), or a tablet computer.

It should be noted that persons of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for selection between a front-facing camera and a rear-facing camera of a mobile terminal, comprising:
   receiving, by the mobile terminal, a photographing request initiated by a user;
   determining, by the mobile terminal, a distance between the mobile terminal and the user; and
   turning on the front-facing camera of the mobile terminal when the distance is greater than or equal to a preset numeric value; and
   turning on the rear-facing camera of the mobile terminal when the distance is less than the preset numeric value.

2. The method according to claim 1, wherein the determining, by the mobile terminal, a distance between the mobile terminal and the user comprises determining, by the mobile terminal, a distance between the mobile terminal and a face of the user.

3. The method according to claim 2, wherein determining, by the mobile terminal, the distance between the mobile terminal and the face of the user comprises:
   determining, by the mobile terminal, a distance between the mobile terminal and a preset position on the face of the user; or
   determining, by the mobile terminal, an overall distance between the mobile terminal and at least two preset positions on the face of the user.

4. The method according to claim 1, wherein the preset numeric value is set by the mobile terminal by default.

5. The method according to claim 4, wherein the photographing request comprises at least a first application request and a second application request; wherein the preset numeric value is a first preset numeric value when the photographing request is the first application request; wherein the preset numeric value is a second preset numeric value when the photographing request is the second application request, and wherein the first preset numeric value is different from the second preset numeric value.

6. The method according to claim 5, further comprising:
acquiring a first probability and a second probability, wherein the first probability is a probability of using the front-facing camera in a first application state, and wherein the second probability is a probability of using the front-facing camera in a second application state; and
separately adjusting the first preset numeric value and the second preset numeric value according to the first probability and the second probability, such that the first probability corresponds to the first preset numeric value and the second probability corresponds to the second preset numeric value.

7. The method according to claim 4, further comprising:
acquiring, by the mobile terminal, usage information about the user's usage of the front-facing camera and the rear-facing camera; and
adjusting the preset numeric value according to the usage information.

8. The method according to claim 4, further comprising:
acquiring, by the mobile terminal, personal information of the user; and
adjusting the preset numeric value according to the personal information.

9. The method according to claim 4, further comprising:
acquiring, by the mobile terminal, a factor of an environment in which the mobile terminal is currently located; and
adjusting the preset numeric value according to the factor of the environment in which the user is currently located.

10. The method according to claim 1, further comprising acquiring the preset numeric value from the user prior to determining the distance between the mobile terminal and the user.

11. The method according to claim 1, wherein before the turning on the front-facing camera of the mobile terminal or before the turning on the rear-facing camera of the mobile terminal, the method further comprises:
sending an inquiry request to the user, wherein the inquiry request is used to ask the user whether to agree to turn on the front-facing camera or the rear-facing camera;
acquiring a reply from the user;
triggering the turning on of the front-facing camera of the mobile terminal or the rear-facing camera of the mobile terminal when the reply is agreeing to turn on the front-facing camera or the rear-facing camera or no reply is received within a preset time period; and
triggering a default action of the mobile terminal when the reply is refusing to turn on the front-facing camera or the rear-facing camera.

12. A mobile terminal, comprising:
a front-facing camera and a rear-facing camera;
a receiver configured to receive a photographing request initiated by a user; and
a processor configured to:
determine a distance between the mobile terminal and the user;
turn on the front-facing camera of the mobile terminal when the distance is greater than or equal to a preset numeric value; and
turn on the rear-facing camera of the mobile terminal when the distance is less than the preset numeric value.

13. The mobile terminal according to claim 12, wherein the processor is further configured to determine a distance between the mobile terminal and a face of the user.

14. The mobile terminal according to claim 13, wherein the processor is further configured to:
determine a distance between the mobile terminal and a preset position on the face of the user; and
determine an overall distance between the mobile terminal and at least two preset positions on the face of the user.

15. The mobile terminal according to claim 12, wherein the preset numeric value is set by the mobile terminal by default.

16. The mobile terminal according to claim 15, wherein the photographing request comprises at least a first application request and a second application request, wherein the preset numeric value is a first preset numeric value when the photographing request is the first application request, wherein the preset numeric value is a second preset numeric value when the photographing request is the second application request, and wherein the first preset numeric value is different from the second preset numeric value.

17. The mobile terminal according to claim 16, wherein the processor is further configured to:
acquire a first probability and a second probability, wherein the first probability is a probability of using the front-facing camera by the user in a first application state, and wherein the second probability is a probability of using the front-facing camera by the user in a second application state; and
separately adjust the first preset numeric value and the second preset numeric value according to the first probability and the second probability, such that the first probability corresponds to the first preset numeric value and the second probability corresponds to the second preset numeric value.

18. The mobile terminal according to claim 15, wherein the processor is further configured to:
acquire usage information about the user's usage of the front-facing camera and the rear-facing camera; and
adjust the preset numeric value according to the usage information.

19. The mobile terminal according to claim 15, wherein the processor is further configured to:
acquire personal information of the user; and
adjust the preset numeric value according to the personal information.

20. The mobile terminal according to claim 15, wherein the processor is further configured to:
acquire a factor of an environment in which the user is currently located; and
adjust the preset numeric value according to the factor of the environment in which the user is currently located.

21. The mobile terminal according to claim 12, wherein the processor is further configured to acquire the preset numeric value from the user prior to determining the distance between the mobile terminal and the user.

22. The mobile terminal according to claim 12, wherein the processor is further configured to:
send an inquiry request to the user, wherein the inquiry request is used to ask the user whether to agree to turn on the front-facing camera or the rear-facing camera;
acquire a reply from the user;
trigger turning on the front-facing camera of the mobile terminal or turning on the rear-facing camera of the mobile terminal when the reply is agreeing to turn on the front-facing camera or the rear-facing camera; and trigger a default action of the mobile terminal when the reply is refusing to turn on the front-facing camera or the rear-facing camera.

\* \* \* \* \*